3,741,958
6-AMINOPENICILLANIC ACID DERIVATIVES AND PROCESS FOR PRODUCING THEM

Peter Wolfgang Henniger, Leiden, Netherlands, assignor to Koninklijke Nederlandsche Gist-en Spiritusfabriek N.V., Delft, Netherlands
No Drawing. Continuation-in-part of application Ser. No. 834,544, June 18, 1969. This application Dec. 15, 1970, Ser. No. 98,445.
Claims priority, application Great Britain, Dec. 18, 1969, 61,843
Int. Cl. C07d 99/16
U.S. Cl. 260—239.1                    10 Claims

ABSTRACT OF THE DISCLOSURE

Novel derivaties of 6-isocyanatopenicillanic acid, their preparation, their use as intermediates in producing penicillines and novel penicillanic acids. The invention further relates to penicillines produced from 6-isocyanatopenicillanic acid and to compositions for therapeutic use containing them.

PRIOR APPLICATION

This application is a continuation-in-part application of our copending commonly assigned U.S. patent application Ser. No. 834,544, filed June 18, 1969.

OBJECTS OF THE INVENTION

It is an object of the invention to provide novel 6-isocyanatopenicillanic acid derivatives and ther preparation.

It is another object of the invention to provide a novel process for the preparation of N-acyl derivatives of 6-aminopenicillanic acid.

These and other objects and advantages of the invention will become obvious from the following detailed description.

THE INVENTION

It has been found that useful new penicillanic acid derivatives, namely 6-isocyanatopenicillanic acid and acid esters of the formula $$O=C=N-CH-CH\underset{O=C-N-CH-C-O-E}{\overset{S\diagup\diagdown CH_3}{\diagdown O\diagup C-CH_3}}\parallel O$$

wherein E is a group easily removable and replaceable by hydrogen to give a free carboxyl group are obtained by reacting phosgene with a penicillanic acid derivative of the formula $$\underset{W-N-CH-CH}{\overset{H}{}}\underset{O=C-N-CH-C-O-E}{\overset{S\diagup\diagdown CH_3}{\diagdown O\diagup C-CH_3}}\parallel O$$

wherein W represents a hydrogen atom or an easily removable group, i.e. a group which is removed upon reaction with phosgene to yield an isocyanato group, and E is a group easily removable and replaceable by hydrogen, i.e. by hydrolysis, to give a free carboxyl group in an inert organic solvent, whereby the grouping W—NH— is converted into an isocyanato group without affecting the rest of the molecule. 6-isocyanato penicillanic acid may be liberated from the ester by methods known per se only at very low temperatures.

According to the invention, it has also been discovered that a variety of 6-(substituted amino)penicillanic acid compounds may be produced by reaction of 6-isocyanatopenicillanic acid esters with reagents which enter into reaction with the isocyanato group without affecting the rest of the molecule.

DESCRIPTION OF THE PREFERRED EMBODIMENTS

According to the invention, esters of the new compound 6-isocyanatopenicillanic acid of Formula 1, which is only stable at low temperatures or/and in solid state, $$O=C=N-CH-CH\underset{O=C-N-CH-COOH}{\overset{S\diagup\diagdown CH_3}{\diagdown O\diagup C-CH_3}}\qquad (I)$$

are isolated and used, such novel esters can be obtained by reaction with an alcohol, E—OH or transesterification with an ester E-Hal, wherein Hal represents a halogen, preferably a chloride atom and E represents a group which, in general terms, sshould meet the following conditions.

(a) Smooth introduction into the carboxylic group; i.e. introduction in such a way that undesired conversions such as opening of the β-lactam ring, of the penicilanic acid skelton do not take place;

(b) Ease of removal, thereby restoring the carboxylic function without affecting the penicillanic acid skeleton;

(c) Satisfactory stability of the ester itself.

Suitable groups which meet the criteria set forth above and which E may thereby represent are, for instance:
(A) various silyl groups such as, e.g. those of the general formulas $(R)_3Si-$ or $(R)_2Si<$, wherein R represents a hydrocarbon radical such as lower alkyl, aryl (preferably phenyl) or aralkyl, preferably phenyl-lower alkyl group. Of all silyl groups the trimethylsilyl group is presenty considered to be most suitable. It should be further observed that silyl esters which are smoothly hydrolyzed, for instance by passing a stream of moist air through a solution wherein they are contained are preferably applied;

(B) A phenacyl or halosubstituted phenacyl group.

The term "lower-alkyl" as used herein denotes an alkyl group having up to six carbon atoms.

The esters of 6-isocyanatopenicillanic acid of Formula II $$O=C=N-CH-CH\underset{O=C-N-CH-COOE}{\overset{S\diagup\diagdown CH_3}{\diagdown O\diagup C-CH_3}}\qquad (II)$$

wherein E is as hereinabove defined can be obtained, according to the invention, by first converting 6-aminopenicillanic acid of Formula III $$H_2N-CH-CH\underset{O=C-N-CH-COOH}{\overset{S\diagup\diagdown CH_3}{\diagdown O\diagup C-CH_3}}\qquad (III)$$

into an ester of general Formula IV $$H_2N-CH-CH\underset{O=C-N-CH-COOE}{\overset{S\diagup\diagdown CH_3}{\diagdown O\diagup C-CH_3}}\qquad (IV)$$

wherein E is as hereinabove defined.

The reaction is preferably carried out in an inert organic solvent medium and in the presence of an acid binding substance. Solvents such as aromatic hydrocarbons, especially toluene are very well suited; for acid binding purposes an organic base such as a teritary amine is preferably used.

According to the invention the ester of Formula IV is then reacted with phosgene in the presence of an inert organic reaction medium to yield the desired compound sometimes violent reaction under control.

According to a modification of the above process, an easily removable group W is introduced at the nitrogen atom of 6-aminopenicillanic acid concurrently with or after the esterification of the carboxylic acid group. For this purpose it is preferred to use, as group W, the group (R)$_3$Si—, wherein R is as hereinbefore defined. In those instances where E and W have the same analogous meaning, i.e. both representing tri(lower)alkylsilyl groups, the reaction conditions are suitably chosen in such a way that both groups E and W are introduced in the same process step. The subsequent reaction with phosgene of the compounds formed by introducing substituent W, which compounds can be represented by the general Formula V:

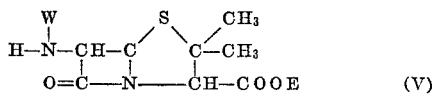   (V)

wherein E and W are as hereinabove defined proceeds much more smoothly, but under analogous conditions, than in the case where a compound of the general Formula IV is used for the same purpose.

In the preparation of a compound of Formula II, special attention should be paid to the reaction conditions in view of both the sensitivity of 6-aminopenicillanic acid towards various influences, such as acidic or alkaline medium, high temperatures, etc. and also the reactivity of the resulting isocyanate group. The reaction should be carried out in a dry, inert solvent medium. For this purpose toluene and methylene chloride or mixtures thereof are particularly suited. Moreover, to facilitate the reaction, an organic base can be added to bind the hydrogen chloride formed. Preferably this base is a tertiary amine, such as triethylamine, which does not react with the isocyanate function under the reaction conditions and the hydrochloride thereof precipitates rather than dissolves in the solvent used.

The current methods of preparing isocyanates employ elevated temperatures to accomplish the formation of the isocyanato group —N=C=O, but, such a procedure would lead to decomposition of 6-aminopenicillanic acid and consequently makes it unsuited for the present purpose. According to a further feature of the invention, the esters of 6-aminopenicillanic acid of Formula IV can be converted into the corresponding 6-isocyanato-penicillanic acid esters of the Formula II at very low temperatures, using the method described hereinabove. Destruction of the bicyclic nucleus is thereby completely or substantially completely prevented. Temperatures of —20° C. and preferably —40° C. are used with advantage.

Starting from the 6-isocyanatopenicillanic acid esters of Formula II a great variety of penicillines can be prepared, using the well-known reactivity of the —N=C=O group. This group can enter into reaction with compounds having a Z—H function wherein Z represents a hetero atom such as O, S, N, P, or As. When the reactant is not sufficiently active, or alternatively the reactivity of the isocyanate used would require the reaction to be carried out at high temperatures, the appropriate compounds can be converted into z-metal compounds. It is also known that an isocyanate is able to react with compounds having an active C—H bond, such as is present in the vinyl —HC=CH$_2$ bond. To activate the reactant, catalytic amounts of certain strong bases such as sodium methylate can be added. The reactant may also be converted quantitatively into an organometallic compound having the desired C-metal bond. A related reaction is that of a Grignard reagent with an isocyanate functional group.

Among the penicillins that can be obtained according to still a further feature of the invention, those of Formula VI are of special interest.

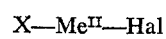   (VI)

in this Formula X represents (a) 

wherein R$_1$ is an optionally substituted hydrocarbon group; including optionally substituted alkyl groups and aryl groups, such as phenyl; halophenyl; alkoxyphenyl; naphthyl and alkoxynaphthyl groups and aralkyl groups, such as a benzyl group, R$_2$ is a hydrogen atom, halogen atom, —CN group, NH$_2$ roup, —CO—NH$_2$ group, —NH—COOY group, COOY group or OY group, wherein Y is a lower alkyl, aralkyl, preferably a benzyl group or aryl, preferably phenyl group, and R$_3$ is a hydrogen atom or a lower alkyl or aryl, preferably phenyl group.

Examples of such groups R$_1$R$_2$R$_3$C— are, e.g.

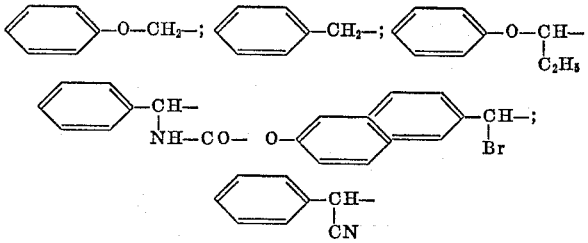

The introduction of the Group X— can be effected by reacting a compound X—CO—OH, wherein X is as hereinabove defined with a compound of Formula II. The reaction is preferably carried out in an inert organic solvent medium such as toluene. A small amount of an organic base such as pyridine may serve as catalyst. The reaction proceeds according the following scheme:

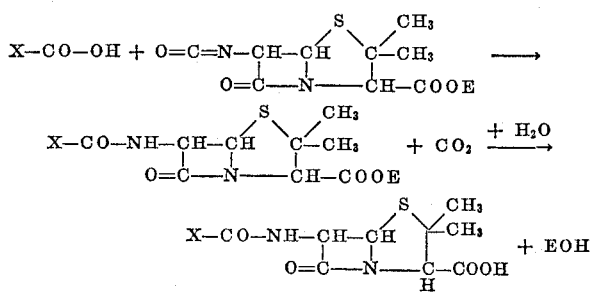

Alternatively X may be introduced by conversion of 6-isocyanato-penicillanic acid derivatives of Formula II with a metal organic compound X—Me$^I$, X—Me$^{II}$—Hal or X—Me$^{II}$—X, wherein X is as hereinbefore defined, Me is a metal atom having the valence indicated by the Roman numerals and Hal representing a halogen, preferably a chlorine or bromine atom. The reaction is carried out in an anhydrous solvent medium under conditions favoring a reaction of the Grignard, Reformatzky or analogous type.

In the examples introduced to further elucidate the invention, it is clearly demonstrated that reaction of 6-isocyanato-penicillanic acid derivatives of Formula II with a carbanion-like reactants of the type X—Me$^I$, X—Me$^{II}$—Hal or X—Me$^{II}$—X can be carried out to produce and then isolate substantial amounts of penicillines which were hitherto unknown or difficultly attainable. These compounds are rendered easily accessible according to the invention when the reactivity of the isocyanate function is appropriately used under suitable conditions. It has been demonstrated that the isocyanate function, depending on conditions is much more reactive that at least three other points of attack (the β-lactam ring, the group —COOE and the part —C—S—C— in the thiazole ring) in the bicycle system of penicillanic acid, known to be highly sensitive towards such carbanion-like reactants. This alternative method may advantageously be applied in such instances where a carboxylic acid, X—COOH required for the more commonly used method is less accessible than compounds X—H or X—Hal.

(b)
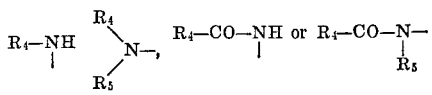

wherein $R_4$ represents a lower alkyl group having not more than 6 carbon atoms; an isocyclic group having not more than 8 carbons atoms; an aryl, especially phenyl or naphthyl group that may carry one or more of the following substituents: alkoxy, hydroxy and carboxy; or a group of the formula

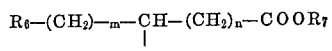

wherein $R_6$ represents a hydrogen atom or an aryl, preferably phenyl group, $n$ and $m$ are integers each ranging from 0 to 4 and $R_7$ is a lower alkyl group or hydrogen; and penicillanyl.

$R_5$ represents a lower alkyl group. Alternatively $R_4$ and $R_5$ together with N form a heterocyclic nucleus such as a benzimidazolyl or piperidyl nucleus. Among suitable compounds that may be used are 1- or 2-naphthylamine, aniline, N-methylaniline, o-methoxyaniline, p-aminosalicyclic acid, anthranilic acid, D-phenylglycine, ethyl glycinate, butylamine, cyclohexlamine, 6-aminopenicillanic acid or esters thereof and benzimidazole.

In the reaction of a compound of the general Formula II with an amine or acid amide as hereinbefore defined, the amine or amide may be used in the more active form of a metal, preferably sodium or lithium salt. The reaction is preferably carried out in an inert organic solvent medium such as benzene or toluene, under anhydrous conditions, preferably in the presence of catalytic amounts of an organic base, such as pyridine. The products resulting from the reaction are ureidopenicillanic acids when an amine is used as reactant and acylureidopenicillanic acids if the reactant is an acid amide.

In Formula VI, X may also be, (c) A group Y—O wherein Y represents an optionally substituted hydrocarbon radical such as an alkyl, particularly lower-alkyl aryl such as phenyl or aralkyl group including aryl-lower-alkyl groups and alkyl amino groups and heterocyclic groups. Among the compounds represented by the hydroxylic reactant Y—OH that can be used to produce such derivatives are benzyl alcohol, ethanol, phenol, p-methoxyphenol, p-bromophenol, morpholinoethanol and quinuolidinol. The products obtained belong to the class of 6-penicillanyl unrethane.

The reaction can be carried out without employment of a solvent for the reactants in those instances where Y—OH has good solvent properties. If Y—OH represents a phenol, an inert, anhydrous organic solvent such as toluene is preferably used. The reaction may be facilitated by the addition of a catalyst such as a dialkylstannidiacetate.

In Formula VI, X may also be (d)
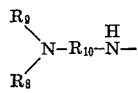

wherein $R_{10}$ is a lower alkyl group or an aryl-lower alkyl group and $R_9$ and $R_8$ may be the same or different and may be a lower alkyl group, lower alkylhydroxy group, $R_9$ and $R_8$ taken together with the nitrogen may be a heterocyclic group and $R_9$ may be hydrogen.

Compounds of this type may be prepared for example by reaction of a compound of Formula II with a polyamino compound such as 2-methylaminobenzylamine, 2-dimethylamino ethylamine and morpholinoethyl amine.

In Formula VI, X may also be (e) A carboxy substituted alkyl, cycloalkyl or aryl group which group may also contain hetero substituents and heterocyclic rings such as the mercapto group and the indolyl group.

Compounds such as p-aminobenzoic acid, tryptophan and cysteine and 1-aminopentane carboxylic acid yield carboxy-substituted alkyl and aryl 6-ureidopenicillanic acids of the type just described when reacted with a compound of Formula II.

The above noted amino acids are, of course, used in the form of a suitable derivative such as the O,N-di(trimethylsilyl) compounds.

(f) An aryl nucleus optionally substituted with lower alkyl, lower alkoxy.

Another group of very interesting 6-substituted-penicillanic acid derivatives have the formula (VII)
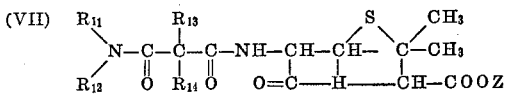

wherein $R_{13}$ is selected from the group consisting of hydrogen and lower alkyl of 1 to 7 carbon atoms, $R_{14}$ is selected from the group consisting of lower alkyl of 1 to 7 carbon atoms, an aryl, an aryloxy, an arylthio of 6 to 20 carbon atoms, cyclic lactams and aromatic heterocyclics linked through a carbon atom, $R_{11}$ and $R_{12}$ are selected from the group consisting of hydrogen, lower alkyl of 1 to 7 carbon, aryl of 6 to 20 carbon atoms, an aroyl group of 7–13 carbon atoms, cycloalkyl of 4 to 8 carbon atoms and aryl and alkyl sulfonyl and aryl and alkyl carbonyl and together with the nitrogen atom to which they are attached form a heterocyclic which may contain another nitrogen, oxygen or sulfur heteroatom and the groups of $R_{13}$, $R_{14}$, $R_{11}$ and $R_{12}$ may be substituted with at least one substituent from the group consisting of halogenes, nitro, alkyl and alkoxy, ester and amide groups and Z is selected from the group consisting of hydrogen, alkyl, alkali metal cations, alkaline earth metal cations and amines, or amide derivatives from the carboxylic acids, such as saccharinyl, succinimido or phthalimido derivatives.

Examples of suitable substituents in Formula VII are $R_{13}$ as hydrogen, methyl, ethyl, propyl, n- or isobutyl, pentyl and hexyl, $R_{14}$ as lower alkyl such as methyl, ethyl or pentyl or aryl such as phenyl, biphenyl or naphtyl; aryloxy or arylthio such as phenoxy or naphthoxy or phenylthio, cycliclactams such as pyrrolid-2-on-5-yl or aromatic heterocyclics such as pyridyl, quinolyl, pyrazinyl, thienyl, thiazolyl or furyl, $R_{11}$ and $R_{12}$ may be hydrogen, lower alkyl or aryl as described above, aroyl such as benzoyl, cycloalkyl such as cyclopentyl, cyclohexyl or cycloheptyl, sulfonyl or carbonyl groups such as benzene sulfonyl or p-tolyl sulfonyl and when taken together with the nitrogen may be a heterocyclic such as pyrrolidino, piperidino or morpholino.

Examples of some Z substituents are alkali metals such as potassium, sodium or cesium; alkaline earth metals such as calcium or barium, primary, secondary or tertiary amines such as alkyl amines, i.e. triethyl amine, triethyl amine, diethyl amine, monoethanol amine, triethanol amine, cycloalkyl amines, such as cyclohexyl amine, dicyclohexylamine or dibenzyl amine and heterocyclic amines such as procaine, n-ethyl piperidine or n-ethyl piperidine or n-ethyl pyridine.

The 6-substituted-penicillanic acids of Formula VII may be prepared by reacting a 6-isocyanatopenicillanic acid ester of the formula

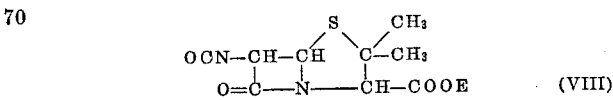

(VIII)

wherein E represents an organic radical which is easily removable and replaceable by hydrogen to give a free carbonxyl group with a compound of the general formula

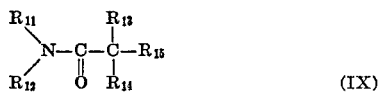
(IX)

wherein $R_{13}$, $R_{14}$, $R_{11}$ and $R_{12}$ are hereinbefore defined $R_{15}$ is carboxyl, or a group $Me^I$ or $Me^{II}X$ in which Me represents a metal atom, the roman figure representing its valence, e.g. sodium, lithium, magnesium and X represents a halogen atom.

Preferably, the group E in Formula VIII should meet the following conditions:

(a) It should be capable of smooth introduction into the carboxyl group of 6-aminopenicillanic acid of the formula

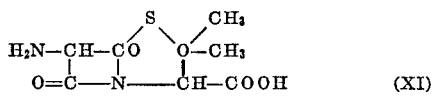
(XI)

so that undesired conversions, such as opening of the β-lactam ring of the penicillanic acid skeleton, do not take place;

(b) It should be easily removable, to enable restoration of the carboxylic function without affecting the penicillanic acid skeleton, and (c) It should give the ester itself satisfactory stability.

Suitable groups of E' are, for example, (1) Silyl groups such as those of the general formula $(R)_3Si$-wherein R represents a hydrocarbon radical such as a lower alkyl, aryl (preferably phenyl) or aralkyl (preferably phenyl-lower alkyl) group. It should be observed that such silyl esters conforming to Formula VIII as are easily and smoothly hydrolysed are preferred and, in particular, the esters in which E is a trialkylsilyl group, and especially the trimethylsilyl group. The silyl ester group can be readily hydrolysed by addition of alcohols or water to the silyl ester.

(2) A phenacyl group optionally substituted on the benzene ring (preferably in the para-position) by halogen, e.g. p-bromophenacyl.

(3) A benzyl or benzhydryl group.

Instead of the 6-isocyanatopenicillanic acid esters of Formula VIII there can be employed as a modification of the aforementioned processes the saccharinyl, succinimido and phthalimido amide derivatives of 6-isocyanatopencillanic acid to give by reaction with compounds of general Formula IX, $R_{15}$ representing the carboxyl group or an atom $Me^I$ or a group $Me^{II-Hal}$ as hereinbefore defined, the corresponding amide derivative of the penicillanic acids of general Formula VII.

The reaction between a 6-isocyanatopenicillanic acid ester or amide and an acid of Formula IX wherein $R_{15}$ is carboxyl group is preferably carried out in an inert organic solvent medium such as dichloromethane, toluene or benzonitrile. A small amount of an organic base, for example pyridine, is advantageously present as catalyst. This method is particularly advantageous when the acid reactant has a $pK_a$ in water of about 4.5 or lower. The ester group in the resulting product may be removed by hydrolysis, e.g. by aqueous acetone when the esterifying residue is a silyl group.

The reaction between a 6-isocyanatopenicillanic acid ester or amide, and an organo-metal compound of Formula IX wherein $R_{15}$ is a group $Me^I$ or $Me^{II}$—X, as hereinbefore defined, is carried out in an anhydrous organic solvent medium under conditions favoring a reaction of the Grignard, Reformatsky or analogous type. Good results may be obtained when using Grignard or organolithium compounds in a method consisting in the addition of an isocyanato of Formula VIII dissolved in a suitable solvent (e.g. toluene) to, generally, a very cold solution of the Grignard or lithium compound in a solvent such as tetrahydrofuran, diglyme (2,2'-dimethoxy-diethyl ether) or 1,2-dimethoxyethane, to which may be added, if necessary, a predetermined amount of a highly dipolar aprotic solvent such as tetramethylurea, N-methylpyrrolidone or, especially, hexamethylphosphontriamide. This method is particularly suitable when Grignard reagents of Formula III are reacted with isocyanates. The other isocyanate starting materials used in the process of the invention, i.e. the saccharynyl, succinimido and phthalimido amide derivatives of 6-isocyanatopenicillanic acid, can be prepared in a similar manner to that described above for the preparation of 6-isocyanato penicillanic acid esters of Formula II by the reaction of phosgene with the corresponding amide derivatives of 6-amino (or substituted amino)penicillanic acid, which themselves can be obtained from the appropriate penicillanic acids by methods known per se for converting an acid to an amide.

The penicillanic acid derivatives of Formulas VI and VII wherein X is as hereinbefore defined, insofar as they are novel, have antibiotic properties which make them potentially useful as medicines for men and animals and as additives for animal feed.

They are preferably applied in the form of amides such as saccharinyl, succinimido and ptalimido amides or in the form of non-toxic salts such as alkalimetal and alkaline earth metals, i.e. sodium, potassium and calcium salts. Other salts that may be used in pharmaceutical preparations include the non-toxic suitably crystallizing salts with organic bases such as amines like trialkylamines, procaine, dibenzylamine and the like.

When used for therapeutic purposes the compounds of the invention may be used as such or in the form of a pharmaceutical preparation customarily employed for the administration of therapeutically active substances, especially antibiotics. The invention includes within its scope pharmaceutical preparations containing, as the active ingredient, one of the novel penicillins of the invention. The present new penicillin compounds can be formulated in known pharmaceutical compositions employed for the administration of any of the penicillins in current use. For example, a capsule formulation that can be used for administering the present novel and active penicillin compounds is that employed for ampicillin which includes:

|  | Mg. |
|---|---|
| One or more novel, 6-substituted penicillanic acid compounds of Formula VI and VII | 250 |
| $CaCO_3$ | 150 |
| Cab—O—Sil—M5 (an anhydrous, particulate colloidal silicate) | 5 |
| Sodium nitrate, anhydrate | 20 |
| Magnesium stearate | 7.5 |
| Amberlite XE—88 (an ion exchange resin) | 5.0 |
| Micro-Cel C (finely divided, hydrated synthetic silicate) | 90 |

The preferred types of pharmaceutical preparation are those suitable for oral administration and especially capsules. Such capsules are preferably made of absorbable material, such as gelatin, and may contain the active substance attached to or incorporated in a carrier substance in such a way that the active substance is released over an extended period of time after ingestion. Liquid preparations may be in the form of solutions suitable for parenteral administration.

The novel method of the invention for combating bacterial infection in warm-blooded animals comprising administering to warm-blooded animals a safe and effective antibacterial amount of one of the novel penicillanic compounds of the invention.

The daily dosages for humans range from about 10 to 50 mg./kg. and for veterinary use from about 5 to 25 mg./kg. In human as well as veterinary therapy these daily dosages may be divided into a 1–3 administrations given orally or parenterally.

The following examples are given to further illustrate the best mode currently contemplated for carrying out the present invention; however, they must not be construed as limiting the scope of the invention in any manner whatsoever.

The antibacterial results reported in the examples were obtained by an Agar serial dilution test as follows:

A stock solution of the antibiotic at 2,000 µg./ml. was prepared in a sterile suitable vehicle. Two-fold dilutions were made with sterile $\frac{1}{20}$ mol phosphate buffer pH 6.5 ($KH_2PO_4$—NaOH). 1 cc. quantities of each dilution were incorporated into 19 cc. of brainheart infusion agar in sterile petri dishes. The hardened surface was inoculated with test organisms and incubated 24 hours at 37° C. The minimal inhibitory concentration (MIC) is expressed in γ/cc. the least amount of antibiotic that completely inhibits the test organism.

EXAMPLE I (A) Preparation of a solution of the trimethyl silyl ester of 6-isocyanatopenicillanic acid in toluene from the trimethylsilylester of 6-N-trimethylsilylaminopenicillanic acid.

2 l. of toluene and 150.5 g. (697 mmoles) of 6-aminopenicillanic acid were placed in a 5-l. three-necked flask equipped with stirrer, dropping-funnel, $P_2O_5$-tube and gas inlet tube, through which nitrogen is admitted. 220 ml. (1579 mmoles) of triethylamine were added and over a period of about 20 minutes 250 ml. (approximately 1980 mmoles) of trimethylchlorosilane were added dropwise. Stirring was continued at room temperature for 2.5 hours after completion of the addition. Another portion of 1 l. of toluene was added and the temperature was lowered to −60° C. Next, 90 ml. (646 mmoles) of triethylamine and then, 112 ml. (about 1.8 mol) of liquid phosgene were added while the temperature of the reaction mixture was kept below −40° C. Stirring was continued for 3 hours at −40° C. At this temperature, the precipitate formed was filtered off under nitrogen and washed with 500 ml. of toluene. The greater part of the phosgene was removed from the combined filtrate and toluene washings by evaporation at −40° C. The temperature was then slowly raised to −20° C. under reduced pressure. The remaining traces of phosgene, together with trimethylchlorosilane and triethylamine were removed while the temperature was allowed to slowly rise to +25° C. and simultaneously most of the toluene was removed. During the evaporation procedure, the pressure was maintained between 0.5 and 1.5 mm. Hg. The final volume of the solution is 750 ml., containing 263 mg./ml. (yield: 80%) of the trimethylsilyl ester of 6-isocyanatopenicillanic acid. This solution was employed for the isolation of the said product in Example II and for the conversion described in Example V.

(B) Preparation of the trimethylsilylester of 6-isocyanatopenicillanic acid from trimethylsilylester of 6-aminopenicillanic acid.

A solution of 60 mmoles of the trimethylsilylester of 6-aminopenicillanic acid in 250 ml. of toluene was slowly added dropwise under a nitrogen-atmosphere to a well-stirred mixture of 132 mmoles of triethylamine, approximately 150 mmoles of phosgene and 90 ml. of toluene. During the addition, the temperature of the reaction mixture was kept below −40° C., and stirring was continued for 3 hours. The reaction mixture was then filtered under nitrogen at −40° C. and the precipitate was washed twice with 60 ml. of cold toluene. While the temperature was allowed to rise slowly from −40° C., the combined filtrates were evaporated under reduced pressure to a final volume of 70 ml. The solution contained 0.71 mmole per ml. of the trimethylsilylester of 6-isocyanatopenicillanic acid for a total yield of 49.7 mmoles (82%).

EXAMPLE II

Isolation of the trimethylsilylester of 6-isocyanatopenicillanic acid 25 ml. of the above-mentioned solution of the isocyanate in toluene prepared in Example 1A was concentrated under reduced pressure and with exclusion of moisture to a volume of about 10 ml. and spontaneous crystallization occurred. 3 ml. of anhydrous toluene were added and the crystalline product was vacuum filtered under nitrogen and washed twice with toluene. The crystals were freed from traces of toluene and stored in a nitrogen atmosphere to obtain about 4 g. of the tri-trimethylsilyl ester of 6-isocyanatopenicillanic acid and melting 85°–88° C. and having a specific rotation $[\alpha]_D$ 20°=+163.3° in toluene. Mol. weight by mass spectroscopy: 314 (calculated 314).

*Analysis.*—(C, H and N) calc'd. for $C_{12}H_{18}N_2O_4SSi$ (percent): C, 45.86; H, 5.73; NZ, 8.92. Found (percent): C, 45.92 (45.93 and 45.90; H, 5.78 (5.74) and 5.82; NZ, 8.87 (8.89 and 8.85).

The IR and PMR spectra in toluene (before isolation) and in carbon tetrachloride (after isolation) indicate the structure of the compound and the purity of the solution in toluene primarily obtained (greater than 95%).

The primarily obtained solutions in toluene can be stored for months at about 0° C. without any appreciable decomposition. The solid is also stable for a considerable time provided the usual precautions for hygroscopic substances are taken. The solid readily dissolves in solvents such as diethylether or carbon tetrachloride.

Analysis of the PMR spectra of 6-isocyanatopenicillanic acid trimethylsilyl ester (taken at 60 Mc; δ values in p.p.m., using tetramethyl silane as internal standard).

| Solvent (conc.) | Si(CH₃)₃ | CH₃ | C₂—H | C₅—H and C₆—H AB-quartet; J=4.0—0.2 cps. | | | |
|---|---|---|---|---|---|---|---|
| Toluene (about 240 mg./ml.) | 0.20 | 1.33 | 1.40 | 4.41 | 4.07 | 4.13 | 5.06 5.13 |
| Carbon tetrachloride (about 120 mg./ml.) | 0.32 | 1.54 | 1.67 | 4.42 | 4.73 | 4.80 | 5.57 5.53 |

Analysis of the IR spectrum of 6-isocyanatopenicillanic acid trimethylsilyl ester recorded in $CCl_4$ solution; conc.: about 10 mg./ml.; values in cm.⁻¹.

| N=C=O | C=O β=lactam | C=O ester | Si(CH₃)₃ | Si—O—C |
|---|---|---|---|---|
| 2,255 | 1,795 | 1,728 | 1,256, 850 | 1,028 |

EXAMPLE III

Preparation of a solution of phenacyl ester of 6-isocyanato-penicillanic acid in toluene As starting material the benzenesulfonate of 6-amino-penicillanic acid-phenacyl ester was used which was obtained in the usual way from 6-amino-penicillanic acid and phenacyl bromide (P. Bamberg et al., Acta Chem. Scand. 21 (1967) 2210). 17.22 g. of this product (35 mmoles) were suspended in 100 ml. of ice-water and 250 ml. of ethyl acetate. With stirring, the pH was adjusted to 8.0 with 4 N NaOH and the water layer was decanted and extracted with one 50 ml. portion of ethyl acetate. The combined ethyl acetate extracts were washed twice with 50 ml. of cold water. The organic layer was briefly dried with calcium sulphate and filtered. 250 ml. of anhydrous toluene were added to the filtrate and the solution was concentrated at room temperature to a volume of about 200 ml.

The concentrate was added dropwise but as rapidly as possible under vigorous stirring and in a nitrogen atmosphere to a mixture of 100 ml. of toluene, 5.8 ml. (about 90 mmoles) of phosgene and 12 ml. of triethylamine (86 mmoles), 1 ml. of trimethylchlorosilane being employed as water binding agent. Stirring was continued for 3 hours at −40° C. Working up was as described in Example I.

The volume of the final solution was 60 ml. This not completely pure solution contained 0.416 mmol/ml. of the desired 6-isocyanatopenicillanic acid phenacyl ester.

The yield calculated from the benzenesulfonate of 6-aminopenicillanic acid-phenacyl ester was 71%. The structure of this isocyanate was established by the IR and PMR spectra of its solution in toluene.

Upon concentration of the solution in vacuo, an almost pure product was obtained after precipitation of a crystalline byproduct. The solution was filtered under nitrogen and evaporated to near-dryness leaving an almost colorless oily residue which was difficult to crystallize. The IR spectrum of this oil (in carbon tetrachloride) showed the expected absorption bands. Analysis of the PMR spectra of 6-isocyanato-penicillanic acid phenacyl ester (taken at 60 Mc; $\delta$ values in p.p.m., using tetramethylsilane as internal standard).

| Solvent (conc.) | $CH_3$ | | $C_2$—H | $C_5$—H and $C_6$—H AB-quartet; $J=4.0\pm02$ cps. | | | $CH_2$(in ester group) AB-quartet; $J=16.5\pm0.5$ cps. | |
|---|---|---|---|---|---|---|---|---|
| Toluene (about 155 mg./ml.) | 1.48 | 1.57 | 4.59 | 4.05, 5.04 | 4.11, 51.0 | | 4.57, 4.93 | 4.85, 5.21 |
| Carbon tetrachloride (about 60 mg./ml.) | 1.66 | 1.72 | 4.55 | 4.74, 5.46 | 4.81, 5.53 | | 5.04, 5.38 | 5.32, 5.66 |

In the spectra the $C_6H_5$ group was represented between about 7.2 and 8 p.p.m.

Analysis of the IR spectrum of 6-isocyanato-penicillanic acid phenacyl ester (taken in $CCl_4$; conc.: 10 mg./ml.; values in cm.$^{-1}$: 2260 (N=C=O), 1795 (C=O $\beta$-lactam) 1759 (probably C=O of the ester group), 1710 (probably C=O of the phenacyl group).

The primarily obtained solution of the phenacylester of 6-isocyanato-penicillanic acid in toluene was used for the reaction of Example IV.

EXAMPLE IV

Phenoxymethyl penicillin (penicillin V)

A drop of pyridine and 632 mg. (4.16 mmoles) of phenoxy-acetic acid were added with stirring to a solution of 4.16 mmoles of 6-isocyanatopenicillanic acid phenacyl ester in 10 ml. of toluene while passing nitrogen through the solution. After 6 hours of stirring at room temperature, toluene was removed from the reaction mixture by evaporation under reduced pressure. 8 ml. of purified dimethylformamide were added to the residue, 615 mg. (4.16 mmoles) of potassium thiophenoxide dissolved in 2 ml. of dimethylformamide were added to the solution. After 30 minutes stirring at room temperature and addition of 32 ml. of acetone, a precipitate was filtered off, washed with acetone and dried under reduced pressure to obtain 820 mg. (50% yield) of chromatographically pure potassium salt of phenoxy-methyl-penicillin.

EXAMPLE V

Phenoxymethyl penicillin (penicillin V)

0.2 ml. of pyridine and 1.81 g. (11.9 mmoles) of phenoxy-acetic acid were added under a nitrogen atmosphere to 15 ml. of a solution containing 11.9 mmoles of trimethylsilyl ester of 6-isocyanato-penicillanic acid in toluene. The mixture was allowed to react for 6 hours at room temperature. The volume of the reaction mixture was brought to 100 ml. with ethyl acetate and 50 ml. of water were added and the pH was adjusted to 2. The ethyl acetate layer was washed with water, dried and concentrated to a volume of 50 ml. Then 110 ml. of ether were added dropwise and the precipitate formed (Formula VII) was filtered off. The filtrate was treated with a solution of potassium ethylcapronate leading to the precipitation of the potassium salt of phenoxymethyl penicillin in a 60% yield.

EXAMPLE VI

α-phenoxypropyl penicillin (propicillin)

In an analogous way to Example V the reaction of 6-isocyanato-penicillanic acid-tri-methylsilyl ester and α-phenoxybutyric acid was accomplished. At a pH of 6.5, the reaction product was taken up in the water layer. From this layer, the propicillin was removed by extraction with a mixture of ether and ethyl acetate (3:1). The organic layer was dried, concentrated and diluted with ether to which was added a solution of potassium methylcapronate to cause a 25% yield of propicillin to precipitate.

EXAMPLE VII

Benzyl penicillin (penicillin G)

1.62 (11.9 mmoles) of phenyl acetic acid and 0.2 ml. of pyridine were added to a solution of 11.9 mmoles of 6-isocyanato-penicillanic acid trimethylsilyl ester in toluene and the reaction mixture was allowed to react for 4.5 hours at room temperature. The volume therefore was brought to 100 ml. with ethyl acetate and decomposition of the silyl ester was accomplished with 30 ml. of ice-water and ice and acidification to a pH=2.5. Benzylpenicillin was obtained from the organic layer in known fashion to obtain a 35% yield.

EXAMPLE VIII

α-benzoxycarbonylamino benzyl penicillin

In an analogous way to Example VIII α-benzoxycarbonylamino benzyl penicillin (carbobenzoxy-ampicillin) was obtained from 6-isocyanato-penicillanic acid-trimethylsilyl ester and α-phenyl-N-benzoxy-carbonyl glycine in 50% yield. In a manner known, the carbobenzoxy group was split off by hydrogenation leaving α-aminobenzyl penicillin.

EXAMPLE IX

α-bromobenzyl penicillin

Using the procedure of Example VIII, α-bromobenzyl penicillin was obtained from 6-isocyanato-penicillanic acid trimethylsilyl ester and α-bromophenyl acetic acid in 50% yield.

EXAMPLE X

α-cyanobenzyl penicillin

In an analogous way to Example VII the reaction of equivalent amounts of 6-isocyanato-penicillanic acid-trimethylsilyl ester and α-cyanophenyl acetic acid was accomplished.

After the evolution of $CO_2$ had stopped, the reaction mixture was poured into ice-water. At a pH of 6.5, a toluene layer was separated by addition of ether. The water layer was extracted with methyl isobutyl ketone at a pH of 2.5. After washing with ice-water and drying, the organic layer is concentrated to some extent and treated with a small excess of cyclohexylamine till no further precipitation occurred. After filtration, the precipitate containing mainly N,N'-di-(6)-penicillanylurea in addition to the desired penicillin, was triturated with methyl isobutyl ketone. This extract was added to the filtrate containing the major part of the cyclohexylamine salt of α-cyanobenzyl-penicillin. By addition of methyl isobutyl ketone, the excess cyclohexylamine was removed under reduced pressure. Concentration of the solution led to precipitation of α-cyanobenzyl-penicillin-cyclohexylamine salt in a 50% yield. The structure of this penicillin was established by IR and PMR spectra; the latter spectrum showed strong resemblance to that of α-carboxy benzylpenicillin (carbenicillin).

α-cyanobenzyl penicillin shows good antibacterial activity. In the PMR spectra of DL-α-cyanobenzyl penicillin, the D-form and the L-form differ in chemical shift of the absorptions of $C_2$—H, $C\alpha$—H and the $CH_3$-groups at $C_3$. $\delta$ values in p.p.m. (internal reference 2,2-dimethyl-2-silapentane-5-sulfonate) in the spectrum of a solution of the potassium salt in $D_2O$; $CH_3$: 1.50 and 1.45 (3 protons) and 1.50 (3-protons). $C_2$—H: 4.22 and 4.25. $C\alpha$—H: 4.67 (coincides with $H_2O$ abs.; the spectrum of the free acid in $CDCl_3$ shows two absorptions for $C\alpha$—H). $C_5$—H and $C_6$—H: 5.34—5.67 $C_6H_5$: 7.62 N—H: 7.2→7.5.

EXAMPLE XI 6-(N'-1'-naphthyl-ureido) penicillanic acid (1'-naphthyl-ureido penicillin)

13.4 ml. of a solution of 10 moles of 6-isocyanatopenicillanic acid-trimethylsilyl ester in toluene were added in a dry atmosphere at 35° C. over a period of 10 minutes to 2.145 g. (15 moles) of purified 1-naphthylamine and 2 drops of pyridine dissolved in 50 ml. of toluene. The reaction was weakly exothermic and stirring was continued for 1 hour at 0° C. According to thin layer chromatography 90% of the isocyanate was converted to the desired ureido-penicillin-trimethylsilylester. Moist air was introduced into the solution and the ensuing viscous precipitate was washed with petroleum ether and dried. The precipitate (3.47 g.) containing as the main impurity part of the excess of 1-naphthylamine, was dissolved in 65 ml. of dry acetone and 11.3 mmoles of N-ethylpiperidine were added leading to 2.62 g. (53% yield) of crystalline N-ethylpiperidine salt of 6-(N'-1'-naphthyl-ureido)-penicillanic acid of chromatographically pure compound. The structure of this ureidopenicillin was confirmed by its IR and PMR spectrum.

Elementary analysis (C, H, N and S) calc'd for $C_{26}H_{34}N_4O_4S$ (percent): C, 62.62; H, 6.87; N, 11.24; S, 6.42; O, 12.84. Found (percent): C, 62.21; H, 7.11; N, 10.64; S, 6.25; O (13.79).

PMR-spectrum of the potassium-salt dissolved in hexadeutero-dimethylsulfoxide ($\delta$ values in p.p.m.) $CH_3$: 1.57 and 1.64; $C_2$—H: 4.03; $C_5$—H and $C_6$—H: 5.42, 5.67. The IR spectrum (KBr-disk) of the N-ethylpiperidine salt shows inter al. the following carbonyl absorptions (cm.$^{-1}$): 1772 ($\beta$-lactam), 1700 (C=O) of the ureido group), 1595 (carboxylate).

EXAMPLE XII 6-(N'-2-naphthylureido) penicillanic acid (2-naphthyl-ureidopenicillin)

In an analogous way to Example XI the N-ethylpiperidine salt of 6-(N'-2'-naphthyl-ureido) penicillanic acid was obtained in a 68% yield. This is a novel ureidopenicillin.

Elementary analysis (C, H, N and S) calc'd for $C_{26}H_{34}N_4O_4S$: (percent) C, 62.62; H, 6.87; N, 11.24; S, 6.42. Found (percent): C, 62.22; H, 7.08; N, 10.66; S, 6.42.

The IR spectrum (KBr-disk) of the N-ethylpiperidine salt shows inter al. The following carbonyl absorptions (cm.$^{-1}$): 1770 ($\beta$-lactam); 1700 (C=O of the ureido group), 1600 (carboxylate).

EXAMPLE XIII 6-(N'-phenylureido) penicillanic acid (phenylureidopenicillin)

A solution of 0.01 mmole of 6-isocyanato-penicillanic acid trimethylsilyl ester in 15 ml. of toluene was added over a period of 10 minutes at 35° C. while nitrogen was passed through to a solution of 1.1 ml. (0.012 mole) of purified aniline and 2 drops of pyridine in 50 ml. of toluene. The reaction is exothermic. According to thin layer chromatography, the quantitative conversion into the ureidopenicillin silyl ester was completed within 5 minutes of addition of the last portion of the isocyanate. The reaction mixture was cooled in an ice bath and moist air was then passed through for 2 hours. The precipitate was recovered by centrifugation and was successively washed with 3 portions of toluene and 2 portions of petroleum ether to obtain 2.6 g. of desired product.

The mother liquid yielded another crop of 0.6 g. for an overall yield of 3.2 g. (theoretical yield: 3.3 g.) of 6-(N'-phenyl-ureido)-penicillanic acid.

According to thin layer chromatography, the product contained no other penicillin-like components and showed the expected IR and PMR spectra.

1.4 g. of crystalline N-ethyl-piperidine salt of 6-(N'-phenylureido) penicillanic acid was obtained by dissolving 1.6 g. of ureidopenicillin in acetone, and adding an equivalent of N-ethyl-piperidine to the solution.

Elementary analysis (C, H, N and S) calc'd for $C_{22}H_{32}N_4O_4S$ (percent): C, 58.91; H, 7.19; N, 12.49; S, 7.13; O, 14.28. Found (percent): C, 58.51; H, 7.36; N, 12.42; S, 7.03; O (14.68).

EXAMPLE XIV 6-(N'-o-methoxy-phenyl)-ureidopenicillanic acid

In a dry atmosphere, a solution of 10 mmoles of 6-isocyanato-penicillanic acid-trimethylsilyl ester in 13.6 ml. of toluene was added dropwise over a period of 7 minutes at 35° C. to a solution of 1.7 ml. (15 mmoles) of o-methoxyaniline in 50 ml. of anhydrous toluene. According to thin layer chromatography, the conversion of the isocyanate into the ureidopenicillin proceeded quantitatively. At 0° C., moist air was passed through one mixture and the precipitate was vacuum filtered and washed with petroleum ether. The precipitate was dried in a vacuum desiccator and amounted to 3.85 g. The precipitate was then dissolved in 60 ml. of acetone and the solution was filtered. Addition of 1.41 ml. of N-ethylpiperidine in 25 ml. of acetone yielded 3.48 g. of the N-ethylpiperidine salt of 6-(N'-o-methoxy-phenyl)-ureidopenicillanic acid. ½ $H_2O$. Concentration of the mother liquid yielded another 330 mg. of pure product for a total yield of 78%. The product was identified through its IR and PMR spectra.

Elementary analysis (C, H, N and S) calc'd for $C_{23}H_{34}N_4O_5S.½H_2O$ (percent): C, 56.67; H, 7.14; N, 11.49; S, 6.57; O, 18.13. Found (percent): C, 56.70; H, 7.24; N, 11.09; S, 6.29; O (18.68).

The IR spectrum (KBr-disk) of the N-ethylpiperidine salt shows inter al. the following carbonyl absorptions (cm.$^{-1}$): 1763 ($\beta$-lactam), 1693 and 1673 (C=O of the ureido group), 1595 (carboxylate).

EXAMPLE XV (A) 6-(N'-3-hydroxy-4-carboxy phenyl-ureido) penicillanic acid.—In an analogous way to Example XIV a solution of 16 mmoles of O,O'-di(trimethylsilyl)-p-aminosalicylic acid in 70 ml. of toluene was recated in the presence of a catalytic amount of pyridine with a solution of 10 mmoles of 6-isocyanato-penicillanic acid-triethylsilyl ester in 13 ml. of toluene. After stirring for 10 hours at 35° C., the isocyanate was completely converted leading to the tri(trimethyl) silyl derivative of the ureidopenicillin which was obtained as a crude product in 80% yield. Working up was as described in Example XIV to obtain about 50% yield of amorphous (mono)-N-ethyl-piperidine salt of 6-(N'-3-hydroxy-4-carboxy-phenyl- ureido)-penicillanic acid with more than 90% purity. The product was identified by its IR spectrum.

(B) In an analogous way the trimethylsilyl esters and the triethylamine salts of anthranilic acid and D-phenylglycine were reacted with 6-isocyanato-penicillanic acid-trimethylsilyl ester to give the amorphous N-ethyl-piperidine salts of 6-(N'-o-carboxy-phenyl-ureido)penicillanic acid and of 6-(N'-$\alpha$-carboxybenzyl-ureido)-penicillanic acid, respectively. These three N'-substituted derivatives of 6-ureidopenicillanic acid are novel compounds.

(C) 6-(N' - carbethoxy methylureido) - penicillanic acid.—In an analogous way, a solution of 10 mmoles of 6-isocyanato-penicillanic acid-trimethylsilyl ester in 13 ml. of toluene was added dropwise to a solution of 15 mmoles of glycine-ethyl ester in toluene at +35° C. After stirring for some hours at +35° C., the isocyanate as shown by thin layer chromatography, was completely converted to two compounds of which the main component was the desired ureidopenicillin. The reaction product was worked up, as above to obtain 2.24 g. of crystalline N-ethyl-piperidine salt of 6-(N-carbethoxy-methyl ureido) penicillanic acid. The product is identified by its IR spectrum.

Elementary analysis (C, H, N and S) calc'd for $C_{20}H_{34}N_4O_6S$ (percent): C, 52.39; H, 7.47; N, 12.22; S, 6.98; O, 20.94. Found (percent): C, 52.54; H, 7.49; N, 12.11; S, 7.01; O (20.85).

In vitro tests with 6-(N'α-carboxybenzylureido)-penicillanic acid was active against gram positive bacteria *Bacillus subtilis* 6633 and *Staphylococcus aureus* A 55 and A 321 at minimum inhibiting concentrations less than 2γ per ml. and against *Pasteus rettgeri* A 821 and *Proteus Spec* H3 at minimum inhibiting concentrations of about 68 per ml. Moreover, in toxicity studies in the mice, the said compound had an $LD_{50}$ greater than 1000 mg./kg. administered intraperitonically which means that the compound is non-toxic to mice.

EXAMPLE XVI

6-(N'-butyl-ureido) penicillanic acid

In an analogous way to Example XIV a solution of 10 mmoles of the trimethylsilyl ester of 6-isocyanatopenicillanic acid in 60 ml. of toluene was reacted with 21 mmoles of n-butylamine in the presence of a little pyridine. The exothermic reaction proceeded quantitatively to the trimethylsilyl ester of the desired ureidopenicillin. Moist air was passed through the mixture and 3.9 g. of product was isolated. According to thin layer chromatography, the desired ureido-penicillin, probably in the form of its n-butylamine salt, was the sole product isolated. The product was dissolved in acetone and reacted with 20% excess of N-ethyl-piperidine to yield 1.8 g. of crystalline N-ethyl-piperidine salt of 6-(N'-n-butyl-ureido) penicillanic acid.

Elementary analysis calc'd for $C_{20}H_{36}N_4O_4S$ (percent): C, 56.05; H, 8.47; N, 13.08; S, 7.47; O, 14.93. Found (percent): C, 55.93; H, 8.60; N, 11.16; S, 7.52 O (14.79).

EXAMPLE XVII

6-(N'-cyclohexyl-ureido) penicillanic acid

In the way as described in Example XVI, the trimethylsilyl ester of 6-iso-cyanato-penicillanic acid was reacted with cyclohexylamine to give practically quantitatively an amorphous substance which according to thin layers chromatography was a pure product. 1.8 g. of this product was converted into 1.3 gm. of the crystalline N-ethylpiperidine salt of 6-(N'-cyclohexyl-ureido) penicillanic acid.

Elementary analysis calc'd for $C_{22}H_{38}N_4O_4S$ (percent): C, 58.13; H, 8.43; N, 12.33; S, 7.04; O, 14.07. Found C, 57.8; H, 8.55; N, 12.19; S, 6.95; O (14.43). (14.43).

EXAMPLE XVIII

6-(N'-6-penicillanyl-ureido) penicillanic acid

Addition of the trimethylsilyl ester of 6-isocyanatopenicillanic acid to an equivalent amount of the trimthyl silyl ester of 6-amino-penicillanic acid in a toluene solution in the presence of a little pyridine at room temperature resulted in a crystalline precipitate in 50% yield which, according to thin layer chromatography, was in a pure state. This compound constituted the main component of the solution in toluene. Identification of the di-(trimethyl-silyl) ester of N'-6-penicillanyl-6-ureidopenicillanic acid was accomplished by recording its IR and PMR spectra. From this compound, the crystalline dicarboxylic acid was obtained as mono-etherate by acid hydrolysis.

Elementary analysis (N and S) Calc'd for $O_{17}H_{22}N_4S_2O_7.(C_2H_5)_2O$ (percent): N, 10.53; S, 12.03. Found (percent): N, 10.70; S, 12.08.

This novel compound shows biological activity. The compound could also be isolated in a pure state from the reaction of the tri-methylsiyly-ester of 6-isocyanato-penicillanic acid and water where it constituted the main constituent of the solution. PMR spectrum of the free acid in $CDCl_3$: (δ values in p.p.m.): $CH_3$: 1.59 and 1.68; $C_2$—H: 4.33; $C_5$—H and $C_6$—H 5.45–5.73; N—H 7.07 (doublet: J=9 cps.) PMR-spectrum of the di-trimethyl-silylester in $CDCl_3$: $OSi(CH_3)_3$; 0.33; $CH_3$; 1.54 and 1.60; $C_2$—H: 4.36; $C_5$—H and $C_6$—H 5.50→5.78; N—H: 6.47. The IR spectrum (KBr-disk) of the potassium-salt shows inter al. the following carbonyl absorptions (frequently in $cm.^{-1}$): 1760 (β-lactam), 1665 (C=O of the ureido group), 1600 (carboxylate).

EXAMPLE XIX

1-benzimidazolyl penicillin

In a completely analogous way to Example XVIII 10 mmoles of trimethylsilyl ester of 6-isocyanato-penicillanic acid were reacted with a suspension of 15 mmoles of benzimidazole in toluene. The conversion proceeded rather rapidly at 35° C. without apparent evolution of heat. Moist air was passed through the reaction mixture at 0° C. and 3.7 gm. of a chromatographically pure compound precipitated. 1 g. of the compound was dissolved in a mixture of 15 ml. of ethanol and 50 ml. of ether and a solution of 275 mg. of cyclohexylamine in 10 ml. of ether was added thereto. A crystalline precipitate formed which was washed with ether and dried to obtain 700 mg. of the cyclohexylamine salt of 1-benzimidazolyl-penicillin which was identified by its IR spectrum.

Elementary analysis calc'd for $C_{22}H_{29}N_5O_4S$ (percent): C, 57.50; H, 6.36; N, 15.24; S, 6.96; O, 13.94. Found (percent): C, 56.76; H, 6.55; N, 15.06; S, 7.22; O (14.41).

The IR spectrum (KBr-disk) of the cyclohexylamine salt showed inter al. the following carbonyl absorptions (frequency in $cm.^{-1}$): 1778 (β-lactam), 1705 (C=O of the ureido group), 1590 (carboxylate).

The novel product in vitro tests showed a minimum inhibitory concentration of not more than 10 per ml. and against Staphylococcus A55 and A321, *Streptococcus hoemolytieus* A266, *Brucella melitensis* A488 and *Pasteurella multocida* A723.

EXAMPLE XX

6-(N'-methyl-N'-phenyl-ureido) penicillanic acid

In an analogous way to Example XVIII, the trimethylsilyl ester of 6-isocyanato-penicillanic acid was reacted with a 50% excess of N-methylaniline. According to thin layer chromatography, the exothermic reaction proceeded for at least 85% towards the desired penicillin. The reaction product was poured into an ice-cold buffered solution (pH=7) and the pH of the water layer was adjusted to 2 under an upper layer of butyl acetate. The product was washed and dried and upon addition of a solution of potassium-hexanoate, the crystalline potassium-salt of 6-(N'-methyl-N'-phenyl-ureido) penicillanic acid was obtained from the butyl-acetate layer. The substance was identified by its IR and PMR spectra and was biologically active.

PMR spectrum of the free acid in $CDCl_3$ (δ values in p.p.m.): $CH_3$: 1.42 and 1.52; N—$CH_3$: 3.29; $C_2$—H: 4.33; $C_5$—H and $C_6$—H: 5.48→5.78; N—H: 5.17 (doublet, J=9 cps.); $C_6H_5$: 7.3. PMR-spectrum of the potassium-salt in $D_2O$: $CH_3$: 1.39 and 1.49; N—$CH_3$: 3.23; $C_2$—H: 4.21; $C_5$—H and $C_6$—H: 5.43→5.63 (apparently regular AB-quartet; J=4 cps.); $C_6H_5$: 7.38. The IR spectrum (KBr-disk) of the potassium-salt shows inter al. the following carbonyl absorptions (frequency in $cm.^{-1}$): 1775 (β-lactam), 1673 (C=O of the ureido group), 1600 (carboxylate).

EXAMPLE XXI

Benzyloxy-penicillin (benzyl carbamate of 6-aminopenicillanic acid

A solution of 10 mmoles of the trimethylsilyl ester of 6-isocyanato-penicillanic acid in 13.4 ml. of toluene was evaporated to dryness at room temperature under reduced pressure. To the solid isocyanate, 10 ml. of freshly distilled benzyl alcohol and 0.1 ml. of pyridine were added at 0° C. and the isocyanate dissolved without evolution of heat. The solution was then stirred for 45 minutes at room temperature. According to thin layer chromatography, the conversion of the isocyanate to benzyloxy-penicillin had proceeded for 70%. The reaction mixture was diluted with 125 ml. of ether and extracted with 3 portions totaling 100 ml. of 1 M phosphate buffer (pH=7). The water layer was acidified, under an upper layer of 50 ml. of ether, to a pH of 2.5. The ether layer was decanted and the water layer was once extracted with 25 ml. of ether. The ether extracts were combined, washed and dried over calcium sulfate. After filtration, the solution was treated with N-ethyl-piperidine dissolved in 15 ml. of acetone. The resulting oil was scratched and left standing for 12 hours at 0° C. to crystallize. The crystals were vacuum filtered, washed twice with ether and once with a small amount of acetone and dried in a vacuum desiccator, to obtain 1 g. of crystalline N-ethyl-piperidine salt of benzyloxypenicillin, which according to thin layer chromatography, was in a pure state. It was identified by its IR spectrum.

Elementary analysis (C, H, N and S) calc'd for $C_{23}H_{33}N_3O_5S$ (percent): C, 59.59; H, 7.18; N, 9.07; S, 6.94; O, 17.22. Found (percent): C, 59.22; H, 7.29; N, 8.58; S, 6.69; O (18.22).

EXAMPLE XXII

Ethyloxypenicillin (ethyl carbamate of 6-aminopenicillanic acid

In an analogous way to Example XVIII, 2 gm. of the amorphous cyclohexylamine salt of ethyloxypenicillin was obtained from 10 mmoles of the trimethylsilyl ester of 6-isocyanato-penicillanic acid and excess ethanol. This compound, which was at the least 90% pure, showed the expected IR and PMR spectra. PMR spectrum of the cyclohexylamine salt in $CDCl_3$ (δ values in p.p.m.); $C_3$—$CH_3$: 1.58 and 1.64; $CH_3$ (ethyl); 1.27 (quartet: J=7 cps.); $CH_2$ (ethyl); 4.21 (triplet: J=7 cps.); $C_2$—H: 4.24; $C_5$—H and $C_6$—H: 5.42→5.70;

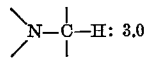

$NH_2$ and COOH: 7.67.

The IR spectrum (KBr-disk) of the cyclohexylamine salt shows inter al. the following carbonyl absorptions (cm.$^{-1}$): 1780 (β-lactam); 1715 (C=O of the carbamine-ester group), ca. 1620 (carboxylate).

The product in vitro tests had a minimum inhibiting concentration of less than 3γ per ml. against *Bacillus subtilis* 6633, *Staphylococcus aureus* A55 and *Streptococcus hoendytieus* A266.

EXAMPLE XXIII p-Methoxy-phenyloxypenicillin (p-methoxy-phenyl-carbamate) of 6-aminopenicillanic acid 22 mmoles of p-methoxy-phenol and 0.3 mmol of dibutyltin diacetate were dissolved in 10 ml. of toluene and under a nitrogen atmosphere, a solution of 20 mmols of the trimethylsilyl ester of 6-isocyanatopenicillanic acid in 40 ml. of toluene was added dropwise with stirring at 65° C. over a period of 1 hour. Stirring was continued for 75 minutes at this temperature. The thin layer chromatogram demonstrated that by then the isocyanate had virtually disappeared and the desired compound had been formed in 50% yield. A dilute sodium hydroxide solution was added and the reaction mixture was poured into an ice-water mixture under stirring. At a pH of 6.0 toluene was extracted with ether and the water layer was once extracted with ether. The water layer was acidified to a pH of 3.8 at 0° C. under an upper layer of ether and then the acid water layer was twice extracted with a little ether. The three ether layers were combined and three times washed with a little ice water and dried over calcium sulfate. The ether extract contained p-methoxy-phenyloxy-penicillin in 85% pure form according to thin layer chromatography. The ether was evaporated at 0° C. and the remaining oil was washed three times with a small amount of cold ether. The oil was dissolved in cold acetone and a small excess of N-ethylpiperidine dissolved in acetone was added dropwise. Addition of a few drops of ether induced the product to crystallize. Upon filtration, washing with ether and acetone and drying the crystalline product (4 g.) consisted of at least 85% of the N-ethylpiperidine salt of p-methoxy-phenyloxypenicillin which was confirmed by IR and PMR-spectra.

PMR spectrum of the N-ethylpiperidine salt in $CDCl_3$ (δ-values in p.p.m.); $CH_3$; 1.65 and 1.70; O—$CH_3$; 3.78; $C_2$—H; 4.40; $C_5$—H and $C_6$—H; 5.3→5.72; N—H; 5.90; $C_6H_4$: 6.67→7.33.

In an analogous way, the reaction of the trimethylsilyl ester of 6-iso-cyanatopenicillanic acid with p-bromophenol and with phenol led to the p-bromo-phenyloxy-, and phenyloxypenicillin respectively. A small amount of potassium-t. butoxide or dibutyltin diacetate can be used as a catalyst.

EXAMPLE XXIV

Nafcillin-1$^1$-[(2-ethoxy)naphthyl)-penicillin 3.4 g. (0.14 mmole) of granular magnesium were added to a solution of 15 g. (0.06 mmole) of 1-bromo-2-ethoxy-naphthalene in 100 ml. of anhydrous ether and the mixture was heated with vigorous stirring and under a nitrogen atmosphere at reflux until reaction set in. Over a period of 4 hours, a solution of 11.28 g. (0.06 mmole) of dibromo-ethane (serving as "entrainer") in 60 ml. of ether was added dropwise to the gently boiling mixture, and the Grignard reagent formed precipitated. About 40 ml. of ether was removed by evaporation and 50 ml. of anhydrous tetrahydrofuran were then added. The mixture that could then be stirred easier was cooled down to —40° C. and a solution of 0.037 mmole of the trimethylsilyl ester of 6-isocyanato-penicillanic acid in 73 ml. of toluene was added dropwise. Stirring was continued for 20 minutes at —30° C. With simultaneous addition of phosphoric acid, the reaction mixture was poured into 200 ml. of ice-water. The pH was adjusted to 6.5 and the organic layer separated. At a pH of 6.5, the water layer was twice extracted with ether. The organic layers were combined and twice extracted with 50 ml. of ice-water at pH of 6.5. The impure water layers containing all the nafcillin formed were combined. Under an upper layer consisting of a mixture of ether and ethyl-acetate (3:1), the pH of water layers was adjusted to 4.3 by addition of phosphoric acid. Upon extraction (three times), all nafcillin was taken up in the organic layer and successive washing with water, drying over magnesium sulfate and evaporation to dryness yielded 5.1 g. of crystalline nafcillin in the form of the free acid. The mother liquid yielded a further crop of 3.02 g. of nafcillin for a total yield of 8.12 g. (53%). The product melted at 136–140° C. and the IR-spectrum was identical to that of a standard reference sample; according to a microbiological determination it contained 89% of nafcillin.

EXAMPLE XXV (A) α-Carboxy-benzylpenicillin (carbenicillin)

3.87 g. (18 mmoles) of α-bromophenyl acetic acid were silylated in 80 ml. of toluene with 2.9 ml. of trimethyl-chlorosilane and 2.65 ml. of triethylamine and upon standing for 90 minutes, the hydrochloride of triethyl-amine was filtered off and the solution was concentrated to 55 ml. In a nitrogen atmosphere, this solution was added over a period of 15 minutes to a solution of 18 mmoles of butyllithium in 18 ml. of ether which solution had been cooled down to −60° C. After stirring for a further 90 minutes at −60° C. a solution of 15 mmoles of 6-isocyanatopenicillanic acid-trimethyl-silyl ester in 20 ml. of toluene was added dropwise over 30 minutes while the temperature was kept at −60° C. Stirring was continued for another hour at −60° C. and the reaction mixture was then poured into 200 ml. of 0.25 M phosphate buffer (pH=7) at 0° C. A small amount of solid material was removed by centrifugation. The layers were separated and the pH of the water layer was adjusted to 4.5. A byproduct formed was removed by extraction with a methyl isobutyl ketone. The pH of the water layer was then brought to 3 and the layer was several times extracted with methyl isobutyl ketone. From the resulting extract the disodium salt of carbenicillin was obtained in the usual way with sodium methyl capronate for a yield of 3.2 g. (50%). The product was identified by its IR and PMR spectrum and its antibiotic spectrum, a reference sample being used as a standard.

(B) α-Carboxy-benzylpenicillin

A solution of 10 mmoles of butyllithium in ether was diluted with petroleum ether and an equivalent of tetramethylethylene diamine was added. After cooling the mixture to −60° C., a mol equivalent of the trimethylsilyl ester of phenylacetic acid dissolved in toluene was added dropwise. The suspension was stirred for 4 hours at −60° C. and at this temperatuure an equivalent amount of 6-isocyanato-penicillanic acid-trimethylsilyl ester dissolved in toluene was added dropwise. Stirring was continued for some hours at −60° C. The reaction mixture was then worked up in the usual way, to also yield the disodium salt of carbenicillin.

EXAMPLE XXVI

α-Cyanobenzylpenicillin

Under exclusion of moisture and atmospheric oxygen, 3.52 g. (27.5 mmoles) of naphthalene and 0.575 g. (25 mmoles) of sodium were reacted in 45 ml. of anhydrous tetrahydrofuran and the reaction mixture was stirred for 2 hours at room temperature. Over a period of 30 minutes, a solution of 2.92 g. (25 mmoles) of benzylcyanide in 7.5 ml. of tetrahydrofuran was added with the temperature being kept below 35° C. The solution turned pale yellow and over a period of 45 minutes this solution was added dropwise to a chilled (−40° C.) solution of 12.5 mmoles of trimethylsilyl ester of 6-isocyanato-penicillanic acid in 65 ml. of toluene. The ensuing suspension was stirred for 90 minutes at −40° C. With vigorous stirring, the reaction mixture was poured into 150 ml. of ice-water with concurrent addition of a dilute phosphoric acid solution to keep the pH at 7. The layers were separated and the water layer was twice extracted with ether, 40 ml. of methyl isobutyl ketone were added to the water layer. The mixture was stirred and the pH adjusted to 3.5 by means of acidification with phosphoric acid. The organic layer was then separated and the water layer again was twice extracted with 40 ml. of methyl isobutyl ketone at pH of 3.5. The combined organic layers were washed with ice-water, dried over calcium sulfate, and filtered. To the filtrate, cyclohexylamine is added and the resulting precipitate (1.4 g.) was washed with acetone. It turned out to be a byproduct as proved by thin layer chromatogram. The washings of acetone and the filtrate were poured into 650 ml. of ether giving a flocculent precipitate of 3.58 g. The mother liquid yielded another crop of 300 mg. The solid material was combined (3.88 g.) and appeared to consist of α-cyanobenzyl-penicillin-cyclohexylamine salt in a 70% pure state. Overall yield of the reaction was at least 45% of α-cyanobenzyl-penicillin.

EXAMPLE XXVII

6-[N'-(o-methylaminobenzyl)-ureido] penicillanic acid

The procedure of Example XIII was followed except that o-methylaminobenzylamine was used in the place of aniline. 6-[N'-(o-methylaminobenzyl)-ureido] penicillanic acid was isolated as a zwitterion by concentration in vacuo of the reaction solvent. This novel product was soluble in dimethylacetamide, and exhibited the infrared absorption characteristics typical of this structure. The proton magnetic resonance spectrum was also consistent with the structure of this compound.

In in vitro tests, this product had a minimum inhibitory concentration of not more than 1γ per ml. against *Bacillus subtilis* 6633, *Staphylococcus aureus* A55 and A321, *Streptococcus hoemolytious* A266 and *Diplococcus pneumoniae* L54.

EXAMPLE XXVIII

6-[N'-(2-dimethylaminoethyl)-ureido]penicillanic acid

The procedure of Example XIII was followed except that 2-dimethylaminoethylamine was used in the place of aniline. 6-[N'-(2-dimethylaminoethyl)-ureido]penicillanic acid was isolated as a zwitterion by concentration in vacuo of the reaction solvent. This novel product was soluble in water, and exhibited the infrared absorption characteristics typical of this structure. The proton magnetic resonance spectrum was also consistent with the structure of this compound.

In in vitro tests, this product had a minimum inhibitory concentration of not more than 5γ per ml. against *Bacillus subtilis* 6633, *Staphylococcus aureus* A55, *Streptococcus hoemolyticus* A266 and *Escherichia coli* U 20.

EXAMPLE XXIX

6-[N'-(3 - dimethylaminopropyl)-ureido]penicillanic acid

The procedure of Example XIII was followed except that 3-dimethylaminopropylamine was used in the place of aniline. 6-[N'-(3-dimethylaminopropyl)-ureido] penicillanic acid was isolated as a zwitterion by concentration in vacuo of the reaction solvent. This novel product was soluble in water, and exhibited the infrared absorption characteristics typical of this structure. The proton magnetic resonance spectrum was also consistent with the structure of this compound. Determination of the PMR-spectrum in a solution of hexadeutero-dimethylsulphoxide was analyzed as follows: (values in p.p.m.): $C_3$—$CH_3$ (6 protons): 1.53 and 1.63, $C_2H_2$ (2 protons): 1.4–2.0 (badly dissolved multiplet); $N(CH_3)_2$: 2.82; N—$CH_2$ (4 protons): 2.97–3.20 (two coinciding triplets, J=7 cps.); $C_2$—H: 4.28; $C_5$—H and $C_6$—H: 5.33–5.63 (multiplet); N—H (2 protons); 6.5–6.9.

In in vitro tests, this product had a minimum inhibitory concentration of not more than 1γ per ml. against *Bacillus subtilis* 6633, *Staphylococcus aureus* A55, *Streptococcus hoemolyticus* A266, and *Eschericia coli* U 20.

EXAMPLE XXX

6-[N'-(3-morpholino)-ureido]penicillanic acid

The procedure of Example XIII was followed except that 3-morpholinopropylamine was used in the place of aniline. 6-[N'-(3 - morpholinopropyl)-ureido]penicillanic acid was isolated as a zwitterion by concentration in vacuo of the reactant solvent. This novel product was soluble in water, and exhibited the infrared absorption characteristics typical of this structure. The proton magnetic resonance spectrum was also consistent with the structure of this compound.

In in vitro tests, this product had a minimum inhibitory concentration of less than 1γ per ml. against *Bacillus subtilis* 6633, *Staphylococcus aureus* A55 and *Streptococcus hoemolyticus* A266.

EXAMPLE XXXI

6-[N'-(3-bis[hydroxyethyl]aminopropyl)-ureido]penicillanic acid

The procedure of Example XIII was followed except that 3-bis(hydroxyethyl)aminopropylamine was used in the place of aniline. 6-[N'-(3-bis[hydroxyethyl]aminopropyl)-ureido]penicillanic acid was isolated as a zwitterion by concentration in vacuo of the reaction solvent. This novel product was insoluble in water, and exhibited the infrared absorption characteristics typical of this structure. The proton magnetic resonance spectrum was also consistent with the structure of this compound.

In in vitro tests, this product has a minimum inhibitory concentration of less than 10γ per ml. against *Bacillus subtilis* 6633, *Staphyloccus aureus* A55, A321 and A355 and *Streptococcus hoemolyticus* A266.

EXAMPLE XXXII

6-[N'-(2-[N-methylanilino]ethyl)-ureido]penicillanic acid

The procedure of Example XIII was followed except that 2-(N-methylanilino)ethylamine was used in the place of aniline. 6-[N'-(2-[N-methylanilino]ethyl)-ureido]penicillanic acid was isolated as a zwitterion by concentration in vacuo of the reaction solvent. This novel product was insoluble in water, and exhibited the infrared absorption characteristics typical of this structure. The proton magnetic resonance spectrum was also consistent with the structure of this compound.

In in vitro tests, this product had a minimum inhibitory concentration of less than 1γ per ml. against *Bacillus subtilis* 6633, *Staphylococcus aureus* A55 and A321 and *Streptococcus haemolyticus* A266.

EXAMPLE XXXIII

6-[N'-(2-morpholinoethyl)-ureido]penicillanic acid

The procedure of Example XIII was followed except that 2-morpholinoethylamine was used in the place of aniline. 6-[N'-(2-morpholinoethyl)-ureido]penicillanic acid was isolated as a zwitterion by concentration in vacuo of the reactant solvent. This novel product was insoluble in water, and exhibited the infrared absorption characteristics typical of this structure. The proton magnetic resonance spectrum which was also consistent with the structure of this compound was analyzed as follows: $CH_3$—$CH_3$ (6 protons): 1.52 and 1.60; $C_2H_2$ (2 protons): 1.4–2.0; N—$CH_2$ (8 protons): 2.5–3.3; O—$CH_2$ (4 protons): 3.45–3.95; $C_2$—H: 4.18; $C_5$—H and $C_6$—H: 5.33–5.67; N—H (2 protons): 6.2–6.8.

In in vitro tests, this product had a minimum inhibiting concentration of less than 5γ per ml. against *Bacillus subtilis* 6633, and *Staphyloccus aureus* A55 and A321.

EXAMPLE XXXIV

6-[N'-(3-dibutylaminopropyl)-ureido]penicillanic acid

The procedure of Example XIII was followed except that 3-dibutylaminopropylamine was used in the place of aniline. 6-[N'-(3-dibutylaminopropyl)-ureido]penicillanic acid was isolated as a zwitterion by concentration in vacuo of the reactant solvent. This product was insoluble in water, and exhibited the infrared absorption characteristics typical of this structure. The proton magnetic resonance spectrum was also consistent with the structure of this compound.

In in vitro tests, this product had a minimum inhibiting concentration of less than 2γ per ml. against *Bacillus subtilis* 6633 and *Staphylococcus aureus* A55 and A321.

EXAMPLE XXXV

6-[N'-(3-[4-methylpiperazino]propyl)-ureido]penicillanic acid

The procedure of Example XIII was followed except that 3-(4-methylpiperazino)propylamine was used in the place of aniline. 6-[N'-(3-[4-methylpiperazino]propyl)-ureido]penicillanic acid was isolated as a zwitterion by concentration in vacuo of the reaction solvent. This product was insoluble in water, and exhibited the infrared absorption characteristics typical of this structure. The proton magnetic resonance spectrum was also consistent with the structure of this compound.

EXAMPLE XXXVI 6-(N'-adamantyl ureido)penicillanic acid

The procedure of Example XIII was followed except that 1-adamantylamine was used in the place of aniline. 6-(N'-adamantylureido)penicillanic acid was isolated as such by concentration in vacuo of the reaction solvent, and trituration under ether. This product was insoluble in water, and exhibited the infrared absorption characteistics typical of this structure. The proton magnetic resonance spectrum was also consistent with the structure of this compound.

EXAMPLE XXXVII

6-[N'-(2,6-dichlorophenyl)-ureido]penicillanic acid

The procedure of Example XIII was followed except that 2,6-dichloroaniline was used in the place of aniline. 6-[N'-(2,6-dichlorophenyl)-ureido]penicillanic acid was isolated as such by concentration in vacuo of the reaction solvent and trituration under ether. This product was insoluble in water and soluble in dimethyl acetamide and exhibited the infrared absorption characteristics typical of this structure. The proton magnetic resonance spectrum was also consistent with the structure of this compound.

EXAMPLE XXXVIII

6-[N'-(p-carboxyphenyl)-ureido]penicillanic acid

The procedure used in Example XV was employed using the O,N-di (trimethylsilyl) derivative of p-aminobenzoic acid rather than the corresponding derivative of p-amino salicylic acid. 6-[N'-(p-carboxyphenyl)-ureido]penicillanic acid was obtained and isolated as such by concentration in vacuo of the reaction solvent and trituration under diethyl ether. This compound exhibited the infrared absorption characteristics typical of this structure, and the proton magnetic resonance spectrum was also consistent with the indicated stucture.

EXAMPLE XXXIX

6-[N'-(2-[3-indolyl]-1-carboxyethyl)-ureido]penicillanic acid

The procedure used in Example XV was employed using the O,N-di(trimethylsilyl) derivative of tryptophan rather than the corresponding derivative of p-aminosalicyclic acid. 6-(N'-(2-[3-indolyl]-1-carboxyethyl)-ureido]penicillanic acid was obtained and isolated as such by concentration in vacuo of the reaction solvent and trituration under ether. This compound was insoluble in water and soluble in dimethyl acetamide, and exhibited the infrared absorption characteristics typical of its structure, and the proton magnetic resonance spectrum was also consistent with the indicated structure.

EXAMPLE XL

6-[N'-(2-cyclohexyl-1-carboxyethyl)-ureido]penicillanic acid

The procedure used in Example XV was employed using the O,N-di(trimethylsilyl)derivative of α-aminocyclohexanepropionic acid rather than the corresponding derivative of p-aminosalicylic acid. 6-[N'-(2-cyclohexyl-1-carboxyethyl)-ureido]penicillanic acid was obtained and isolated as such by concentration in vacuo of the reaction solvent and trituration under ether. This compound was insoluble in water and insoluble in dimethyl acetamide, and exhibited the infrared absorption characteristics typical of its structure, and the proton magnetic resonance spectrum was also consistent with the indicated structure.

23

In in vitro tests the product had a minimum inhibiting concentration of less than 10 γ per ml. against *Bacillus subtilis* 6633, *Staphylococcus aureus* A55 and *Pasteurella multocida* A723.

EXAMPLE XLI

6-[N'-(2-mercapto-1-carbethoxyethyl)-ureido] penicillanic acid

The procedure used in Example XV was employed using the O,N-di(trimethylsilyl) derivative of cysteine ethyl ester rather than the corresponding derivative of p-aminosalicylic acid. 6-[N'-(2-mercapto-1-carbethoxyethyl)-ureido]penicillanic acid was obtained and isolated as such by concentration in vacuo of the reaction solvent and trituration under ether. This compound was insoluble in water and soluble in dimethyl acetamide, and exhibited the infrared absorption characteristics typical of its structure, and the proton magnetic resonance spectrum was also consistent with the indicated structure.

EXAMPLE XLII

6-[N'-(1-carboxycyclopentyl)-ureido]penicillanic acid

The procedure used in Example XV was employed using the O,N-di(trimethylsilyl)derivative of 1 aminocyclopentanecarboxylic acid rather than the corresponding derivative of p-aminosalicyclic acid. 6-[N'-(1-carboxycyclopentyl)-ureido]penicillanic acid was obtained and isolated as such by concentration in vacuo of the reaction solvent and trituration under ether. This compound was insoluble in water and soluble in dimethyl acetamide, and exhibited the infrared absorption characteristics typical of its structure, and the proton magnetic resonance spectrum was also consistent with the indicated structure.

EXAMPLES XLIII TO XLV (3-quinuclidinyloxy)penicillin, (2-morpholinoethoxyl) penicillin, (2-dimethylaminoethoxy)penicillin The procedure described in Example XXI was followed except that the addition of pyridine was omitted and in place of benzyl alcohol, one of the following alcohols was used 3-quinuclidinol, 2-morpholinoethanol, or 3-dimethylaminoethanol. The following corresponding 6-(substituted —OCO—NH)penicillanic acids were isolated as such by concentration in (3-quinuclidinyloxy) penicillin, (2-morpholinoethoxy)penicillin and (2-dimethylaminoethoxy)penicillin. All of these novel compounds were insoluble in water and the 3-quinuclidinyloxy derivative was soluble in dimethyl acetamide. All of these compounds exhibited infrared absorption characteristics typical of the indicated structures. Their proton magnetic resonance spectra were also consistent with the indicated structure.

EXAMPLE XLVI (2-dimethylaminoethylmercapto)penicillin

The procedure of Example XXI was followed substituting 2-dimethylaminoethylmercaptan for benzyl alcohol and omitting the addition of pyridine. (2-dimethylaminoethylmercapto)penicillin was prepared and isolated as such by concentration in vacuo of the reaction solvent and trituration under diethyl ether. This novel compound was insoluble in water and exhibited infrared absorption characteristics typical of the indicated structures. Their proton magnetic resonance spectra were also consistent with the indicated structure.

In in vitro tests, this product had a minimum inhibiting concentration of less than 10γ per ml. against *Bacillus subtilis* 6633 and *Streptococcus haemolyticus* A 266.

All of the novel compounds of Examples XXVII–XLVI show biological activity against gram negative and gram positive bacteria in in vitro tests.

24

EXAMPLE XLVII 0.5 gm. (21 mmol) of magnesium were reacted in a 100 cc. 3-necked flask with 1.7 gm. (21.6 mmole) of isopropyl chloride in 25 cc. of diethyl ether to obtain a solution of isopropyl magnesium chloride to which was added dropwise with stirring while cooling with an ice bath a solution of 3.82 gm. (20 mmol) of N,N-diethylbenzyl-carbonamide in 25 cc. of diethyl ether. The said addition resulted in the liberation of much heat and an oil separated from the solution. The ice bath was removed and the mixture was stirred for 30 minutes under a nitrogen atmosphere. The diethyl ether solvent was distilled off and 20 cc. of anhydrous 2,2'-dimethoxy-diethyl ether were added to the residue to form a slightly yellow suspension. The suspension was cooled to 0° C. and after the addition of 5 cc. of hexamethyl phosphontriamide, the reaction mixture was cooled with stirring to —60° C.

A solution of the trimethyl silyl ester of 6-isocyanato-penicillanic acid in 15 cc. of toluene cooled to —60° C. was added to the reaction mixture over 35 minutes to obtain a substantially clear solution. Thin-layer chromatography showed that the reaction was completed right after the said addition, and that about 70% of the said isocyanate was converted. The reaction mixture was poured into an ice-water mixture buffered with a phosphate to a pH of 7 and the mixture was extracted three times with a 1:1 mixture of diethyl ether and ethyl acetate. The aqueous phase was acidified to a pH of 3.2 and was extracted three times with a 1:1 ethylacetate-diethyl ether. The organic phases were washed twice with a small amount of ice water, dried and concentrated in vacuo at 0° C.

A solution of sodium α-ethylcapronate in methyl acetate was added dropwise to the concentrated solution after which a colorless precipitate formed. The mixture was filtered and the precipitate was washed with cold diethyl ether and dried in vacuo to obtain 2.97 gm. (50% yield) of the sodium salt of 6-(α-N,N-diethylcarbamoylbenzyl) carbon amidopenicillanic acid of the formula

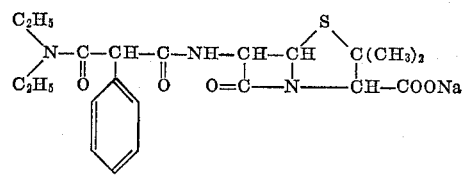

The infrared and PMR spectrum confirmed the structure. In in vitro tests, the product had a minimum inhibitory concentration of less than 1γ/cc. against *Bacillus subtilis* 6633, *Staphylococcus aureus* A55 and A355, *Streptococcus haemolyticus* A266 and *Diplococcus pneumoniae* L54.

EXAMPLE XLVIII 2.37 gm. (7.5 mmol) of the trimethylsilyl ester of 6-isocyanato-penicillanic acid, 1.77 gm. (7.5 mmol) of α-diethylcarbamoyl-phenylacetic acid, 0.05 cc. of pyridine and 25 cc. of dichloromethane were added to a 50 cc. 3-necked flask equipped with a thermometer, a gas inlet through which nitrogen was added and an outlet connected to a small tube dipping into a test tube containing baryte water. The mixture was stirred at room temperature to form a clear solution with the evolution of much carbon dioxide. The solution gradually turned purple and carbon dioxide evolution ceased after 4 hours. The solution was then cooled to —8° C. and 10 cc. of aqueous acetone were added thereto with stirring. The mixture was poured into ice water with simultaneous addition of dilute sodium hydroxide to keep the pH at 7.0. The entire mixture was placed in a separating funnel and the dichloromethane phase was separated. The aqueous layer was washed three times with a small amount of diethyl ether and the pH of the aqueous phase was adjusted to 3.9 with dilute hydrochloric acid. The resulting aqueous turbid solution was extracted for times with toluene and the pH was again adjusted to a pH of 3.9. The aqueous phase was then extracted three times with diethyl ether and the ether extracts were combined, dried and concentrated to a small volume. A solution of 7.5 mmol of sodium α-ethylcapronate in diethylether and a small amount of ethylacetate were added to the concentrated solution and a colorless hygroscopic precipitate was formed. The mixture was filtered and the precipitate was washed with diethyl ether and dried in vacuo to obtain 1.5 gm. of the sodium salt of 6-(α - N,N - diethylcarbamoylbenzyl)carbonamido-penicillanic acid which had a purity of about 90% according to thin-layer chromatography and its PMR spectrum. The impurity was mostly the sodium salt of α-diethylcarbamoyl-phenylacetic acid. The analysis of the PMR spectrum of the product dissolved in hexadeutero-dimethylsulphoxide (60 Mc, δ-values in p.p.m., internal reference tetramethylsilane):

(CH$_2$)—CH$_3$: 1.0 (triplet, J≈6.8 cps.: 6 protons)
C$_3$—CH$_3$: 1.5, 1.6 (doublet, and broadened superposed singulet, 6 protons)
N—CH$_2$: 3.0→3.6 (4 protons)
C$_2$—H: 3.98 (1 proton)
Cα—H: 5.02 (1 proton)
C$_5$—H and C$_6$—H: 5.25→5.60 (2 protons)
C$_6$H$_5$ and N—H: About 7.4 (6 protons)

EXAMPLE XLIX 1.65 gm. of α-N-isopropylcarbamoyl-phenylacetic acid, 2.37 gm. of the trimethylsilyl ester of 6-isocyanatopenicillanic acid, 35 cc. of benzonitrile and a small amount of pyridine were added under an inert atmosphere to a 100 cc. 3-nicked flask and the mixture was held at room temperature for six hours after which the reaction was completed. The reaction mixture was cooled to —5° C. and aqueous acetone was added thereto to hydrolyze the silyl ester. Using the procedure of Example XLVII, the mixture was extracted at a pH of 7 and 3.2 to obtain a diethyl ether solution of product. The solution was evaporated in vacuo to dryness and the residual oil was dissolved in a small amount of ethyl acetate to which was added a slightly more than equivalent amount of sodium α-ethylcapronate in ethyl acetate. The mixture was filtered and the colorless precipitate was washed with ethyl acetate and diethyl ether and dried to obtain 2.2 gm. of the sodium salt of 6-(α-N-isopropyl carbamoyl benzyl) carbonamido penicillanic acid of the formula

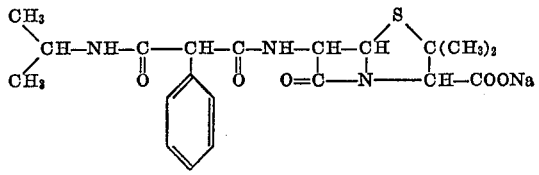

The product was 80% pure with the chief impurities being the sodium salts of α-N-isopropylcarbamoyl-phenylacetic acid and α-ethylcapronic acid. The structure of the product was confirmed by its PMR spectrum in hexadeutero-dimethylsulfoxide.

EXAMPLE L

Using the procedures of Example XLIX, 6.3 gm. of the trimethylsilyl ester of 6-isocyanatopenicillanic acid were reacted with an equimolar amount of α-carbamoyl-phenylacetic acid in the presence of a small amount of pyridine using 63 cc. of anhydrous benzonitrile as the solvent. After stirring for six hours, the reaction mixture was cooled to —5° C. and aqueous acetone was stirred into the reaction mixture which was then poured into ice water simultaneously with dilute sodium hydroxide to keep a pH of 6.5. Diethyl ether was added to the reaction mixture and the two phases were separtaed. Diethyl ether was added with stirring to the aqueous phase and the mixture was adjusted to a pH of 2.5 by addition of dilute hydrochloric acid. The 2 layers were separated and the aqueous phase was extracted twice with diethyl ether and once with ethyl acetate. The combined organic layers were washed twice with ice water, dried over magnesium sulfate, filtered and concentrated to dryness in vacuo. The residue was dissolved in 50 cc. of ethyl acetate and a solution of 2.5 gm. of sodium α-ethylcapronate in 65 cc. of ethylacetate was added thereto at 0° C. with vigorous stirring with formation of a semi-solid precipitate. The supernatant liquor was decanted off and the said precipitate was mixed with a small amount of ethyl acetate to obtain complete precipitation. The precipitate was recovered by filtration and was washed with anhydrous ethyl actate and diethyl ether and dried in vacuo to obtain 4.9 gm. of the sodium salt of 6-(α-carbamoylbenzyl)carbonamido-penicillanic acid of the formula

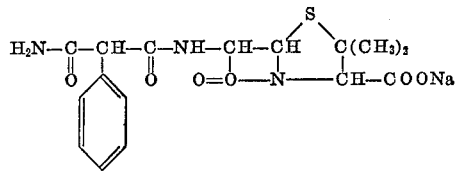

with a purity of about 90%.

Analysis of the PMR spectrum of the final product dissolved in D$_2$O (60 Mc, δ-values in p.p.m., internal standard 2,2-dimethyl-2-silapentane-5-sulphonic acid):

CH$_3$: 1.50, 1.54, 1.57, 1.63 (6 protons)
C$_2$—H: 4.29, 4.33 (1 proton)
C$_α$—H: 4.78, 4.80 (1 proton)
C$_5$—H and C$_6$—H: 5.37→5.65 (multiplet, 2 protons)
C$_6$H$_5$: 7.45 (5 protons)

Partial analysis of the IR spectrum (KBr-disk, values in cm.$^{-1}$):

About 3400: OH and/or NH
3070 and about 3035: =C—
1765: C=O β-lactam
About 1690 and about 1675: C=O amide
1610: C=O carboxylate ion

EXAMPLE LI

Using the procedure of Example L, equivalent amounts of the trimethyl silyl ester of 6-isocyanatopenicillanic acid and α-carbamoyl-phenoxyacetic acid in benzonitrile in the presence of a small amount of pyridine were reacted for 5 hours and the reaction mixture was added to aqueous acetone and extracted as before at pH of 6.5 and 3.0 to obtain a solution of product in a 2:1 mixture of diethyl ether and ethylacetate. The said solution was concentrated in vacuo and dropwise addition of diethyl ether to the gently stirred concentrated solution to obtain a solid precipitate of the sodium salt of 6-(α-carbamoyl-phenoxymethyl)carbonamidopenicillanic acid of the formula

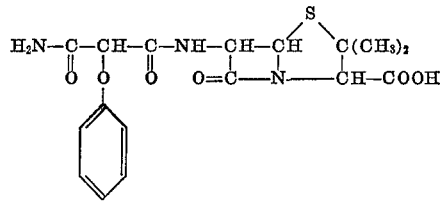

whose structure was confirmed by its infrared and PMR spectra. In in vitro tests, the product had a minimum inhibitory concentration of less than 0.38 γ/cc. against *Bacillus subtilis* 6633, *Staphylococcus aureus* A55 and A321 and *Streptococcus haemolytics* A266.

EXAMPLE LII 3.78 gm. (12 mmol) of the trimethylsilyl ester of 6-isocyanatopenicillanic acid were reacted with 3.0 gm. (12 mmol) of α-4'-morpholino carbonyl-phenylacetic acid in benzonitrile in the presence of 0.1 gm. of pyridine for 4 hours at room temperature and then aqueous acetone was added to the reaction mixture at 0° C. The mixture was poured into a mixture of ice water and diethyl ether while simultaneously adding dilute hydrochloric acid. The RF values of thin-layer chromotograph showed equal amounts of N,N'-di-6-penicillanylurea (byproduct) and desired product and the aqueous solution was fractionally extracted eight times with relatively small amounts of a 3:1 mixture of diethyl ether and ethyl acetate. The combined organic phase was washed with ice-water, dried over magnesium sulfate, filtered and concentrated in vacuo. Diethyl ether was added to the concentrated solution during which a crystalline precipitate formed. The mixture was filtered and the precipitate was washed with diethyl ether and dried in vacuo to obtain 1 gm. of 6-(α-4'-morpholinocarbonylbenzyl)carbonamido-penicillanic acid of the formula

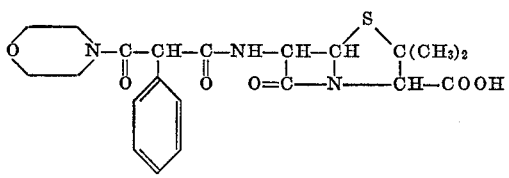

Infrared and PMR spectra showed the product to be a mixture of the D- and L-isomers with at least a 95% purity. The aqueous layer which according to thin-layer chromatography contained additional product was extracted once at a pH of 3.0 with ethylacetate and crystallization from the extract gave another 0.25 gm. of the said acid in practically pure form.

The DL-mixture of the product in in vitro tests had a minimum inhibitory concentration of 1 γ/cc. or less against *Bacillus subtilis* 6633, *Staphylococcus aureus* A55 and A321 and *Streptococcus haemolyticus* A266.

Repeating the above procedure except using diethyl ether alone to extract the aqueous phase at a pH of 3.0 resulted in small amounts of the D- or L-isomer of 6-(α-4' - morpholinocarbonylbenzylcarbonamido - penicillanic acid in a pure crystalline state. Analysis of the PMR spectra of the final compounds dissolved in CDCl₃ and a small amount of hexadeuterodimethylsulphoxide (60 Mc, δ-values in p.p.m., internal reference tetramethylsilane):

|  | DL-mixture | (D or L) isomer |
|---|---|---|
| C₃—CH₃ | 1.58+1.68 and 1.68 (6 p.). | 1.59+1.68 (3 p.). |
| N(CH₂)₂+O(CH₂)₂ | 3.0→4.0 (8 p.); | 3.0→4.0 (8 p.) |
| C₂—H | 4.40 and 4.46 (1 p.) | 4.39 (1 p.). |
| Cα—H | 4.84 and 4.89 (1 p.) | 4.84 1 p.); |
| C₅—H and C₆—H (multiplets, J₁≈4.0 and J₂≈8.0 cps.). | 5.45→5.75 (2 p.) | 5.45→5.72 (2 p.). |
| C₆H₅ | About 7.4 (5 p.) | About 7.4 (5 p.). |
| N—H (doublets, J₂≈8.0 cps.) | 9.32+9.45 and 8.58 +8.70 (about 0.8 p.). | 9.20+9.34 (about 0.8 p.). |

The D- or L-form of the product had in in vitro tests a minimum inhibitory of less than 2 γ/cc. against *Bacillus subtilis* 6633, *Staphylococcus aureus* A55 and *Streptococcus haemolyticus* A266.

EXAMPLE LIII

Using the procedure of Example LII, 3.14 gm. of the trimethylsilyl ester of 6-isocyanatopenicillanic acid and 3.35 of α-(N-p-tolylsulfonyl)-carbamoyl-phenylacetic acid in 30 cc. of benzonitrile in the presence of 0.1 cc. of pyridine were reacted for 5 hours and then extracted with a 9:1 mixture of diethyl ether and ethyl acetate at a pH of 4.0. The concentrated solution was reacted with a solution of sodium α-ethylcapronate in ethyl acetate to obtain 3.0 gm. of the sodium salt of 6-[α-(N-p-tolylsulfonyl)carbamoylbenzyl]carbonamido-penicillanic acid of the formula

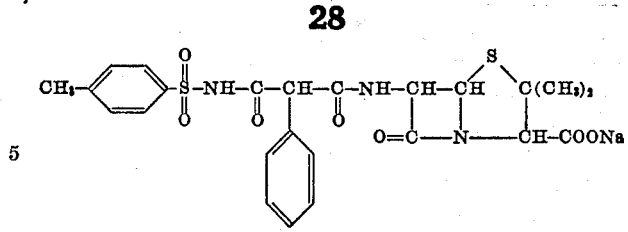

Thin-layer chromatography and the PMR spectrum showed a purity of about 85%.

Partial analysis of the IR spectrum of the final product (KBr-disk, values in cm.¹):

3450: NH
About 3065, about 3042: =CH
1765: C=O β-lactam
1660: C=O amide
About 1605: C=O carboxylate ion
About 1515: NH def.
1493: C=C aromatic
About 1315, 1138: probably SO₂
760,660: arom. subst. pattern In in vitro tests, the product had a minimum inhibitory concentration of not more than 1 γ/cc. against *Bacillus subtilis* 6633, *Staphylococcus aureus* A55 and A321, *Streptococcus haemolyticus* A266, *Pasteurella multocida* A723 and *Proteus mirabilis* 293.

EXAMPLE LIV 3.0 cc. of a solution of 4.45 mmol of n-butyl lithium in hexane was added dropwise to a solution of 1.0 gm. (4.43 mmol) of N-2-pyridyl-benzylcarbonamide-[2-(2'-phenylacetamido)-pyridine] in 10 cc. of tetrahydrofuran distilled over lithium aluminum hydride under a nitrogen atmosphere while maintaining an internal temperature of −20° C. with external cooling. Another 3.0 cc. of the said hexane solution was slowly added to the resulting clear, slightly brown solution at −15 to −20° C. and then clear, orange-brown solution of C,N-dilithiated 2-(2'-phenylacetamido)-pyridine in tetrahydrofuran was stirred for 30 minutes at −20° C. A solution of 1.32 gm. (4.2 mmol) of the trimethylsilyl ester of 6-isocyanato-penicillanic acid in 15 cc. of dry tetrahydrofuran was added thereto dropwise over 25 minutes at an internal temperature of −45±5° C. during which a thick, voluminous precipitate first formed and then almost completely dissolved. The reaction mixture was stirred for 30 minutes at the same temperature after which thin-layer chromatography showed a 40–50% conversion of the isocyanate to the desired product. The pH of the reaction mixture was adjusted to 7 and was then poured into ice water with simultaneous addition of dilute hydrochloric acid. The mixture at a pH of 7 was extracted with ethyl acetate to remove yellow colored impurities. The aqueous layer was then extracted at a pH of 5 with a small amount of ethyl acetate, then twice more with ethlyl acetate, once at a pH of 5 and once at a pH of 4.5. The last two extracts were combined, washed twice with ice water, dried over magnesium sulfate and concentrated to a small volume in vacuo. Petroleum ether was added to the concentrated solution which caused a slightly-yellow solid precipitate to form. The mixture was filtered and the precipitate was dried in vacuo to obtain 800 mg. (40% yield) of 6-[α-(2'-pyridyl)car-bamylbenzyl]-carbonamido-penicillanic acid of the formula

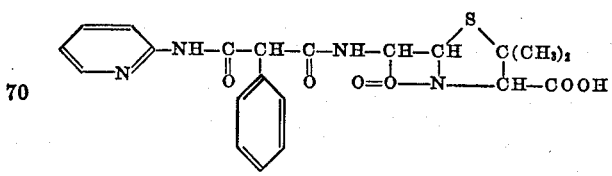

The infrared and PMR spectra showed the product to be almost 90% pure containing some adhering water and petroleum ether. 600 mg. of the said acid in 10 cc. of ethyl acetate was reacted with a solution of sodium α-ethylcapronate in propanol followed by addition of 40 cc. of diethyl ether to obtain 500 mg. of almost colorless sodium salt of the said acid.

Analysis of the PMR spectrum of 6-(α-(2'-pyridyl)carbamoylbenzyl)carbonamido-penicillanic acid dissolved in deuteriochloroform (60 Mc δ-values in p.p.m., internal reference tetramethylsilane):

$C_3$—$CH_3$: 1.6 1.7 (doublet and broadened superposed singlet, 6 protons)
$C_2$—H: 4.54 4.53 (1 proton)
$C_\alpha$—H: 4.8 (unresolved doublet, 1 proton)
$C_5$—H and $C_6$—H: 5.55→6.0 (2 protons)
$C_6H_5$ and $C_5H_4N$ and (N—H)$_2$ 6.9→8.9 (11 protons)
COOH and $H_2O$: ~11.7 (>1 proton)

In vitro tests, the product had a minimum inhibitory concentration of not more than 1.2 γ/cc. against *Bacillus subtilis* 6633, *Staphylococcus aureus* A55, *Pasteurella multocida* A723 and *Haemophilus influenzae* A1030.

EXAMPLE LV

Using the same procedure N-benzoyl-benzylcarbonamido, 2 equivalents of n-butyl-lithium in tetrahydrofuran and the trimethylsilyl ester of 6-isocyanato-penicillanic acid were reacted to obtain the sodium salt of 6[α-(benzoyl)carbamoylbenzyl - carbonamido-pencillanic acid of the formula

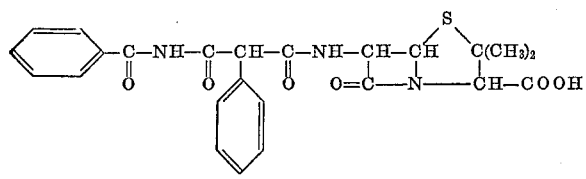

The structure of the compound was confirmed by its IR and PMR spectra. Partial analysis of the IR spectrum of the final product (KBr-disk, values in cm.¹):

About 3400 } N—H
About 3250 }
3065 } =C—H aromatic
3035 }
±1765: C=O β-lactam
±1740 } C=O of the CO.NH.CO group
±1700 }
1685: O=O amide
±1600: C=O carboxylate and C=C aromatic In in vitro tests, the product had a minimum inhibitory concentration of less than 1γ/cc. against *Bacillus subtilis* 6633, *Staphylococcus aureus* A55 and A321, *Diplococcus pneumoniae* L54, *Proteus rettgeri* A821 and *Proteus mirabilis* L93.

EXAMPLE LVI 4.05 gm. (30 mmol) of benzyl-carbonamide (phenylacetamide) were dissolved in 65 cc. of anhydrous tetrahydrofuran in a 250 cc. 3-necked vessel equipped with a gas inlet tube for a continuous nitrogen atmosphere, a dropping funnel connected to a gas outlet tube filled with a desiccant and a thermometer and after cooling to —50° C., a solution of 30 mmol of n-butyl lithium in hexane was added dropwise thereto with stirring.

The slightly yellow coloured solution was then stirred until the color disappeared and then a solution of 30 mmol of twice distilled trimethyl chloro silane in 10 cc. of dry toluene was added thereto dropwise at —30° C. A slightly turbid but colorless solution of N-monotrimethylsilyl-phenylacetamide was obtained. A solution of about 30 mmol of n-butyllithium in hexane was added thereto at —30° C. and stirring was continued to obtain a light solution to which was added at —30° C. another 30 mmol of trimethylchlorosilane in 10 cc. of toluene. 100 cc. of dry toluene were added at 0° C. to the resulting turbid solution and the mixture was concentrated in vacuo to a final volume of 80 cc. The turbid, orange solution was cooled to —65° C. and a solution of 30 mmol of n-butyl-lithium and 30 mmol of N,N,N',N'-tetramethyl-ethylene-diamine in a hexane-petroleum ether mixture was added dropwise while keeping the temperature at —62° C. to —68° C. The mixture was stirred for 40 minutes at —65° C. to —70° C. to obtain a yellow-red turbid solution of α-lithium-di-trimethyl(silyl)-benzylcarbonamide. Then, a solution of 6.6 gm. of (21.3 mmol) of the trimethylsilyl ester of 6-isocyanato-pencillanic acid in 40 cc. of dry toluene was added dropwise to the said solution cooled to —70° C. after which it was stirred for 30 minutes at —70° C. 90 mmol of trimethylchlorosilane were then added to the mixture at —70° C. and the reaction mixture was poured with stirring into a mixture of ice water and diethyl-ether. The pH was adjusted to 7 and thin-layer chromatography showed about 60% conversion to the desired product, 6-(αcarbamoylbenzyl)carbonamidopencillinanic acid, with the principal byproduct being n-butyl-carbonamido-penicillanic acid. The organic layer was removed and the aqueous layer was extracted twice with dimethyl ether and after adjusting the pH to 5, it was extracted 3 times with diethyl ether and once at a pH of 4.5 with a 9:1 mixture of diethyl ether and ethyl acetate and finally at a pH of 2.5 with a 9:1 mixture of diethyl ether and ethyl acetate. The porduct was worked up to obtain a 3.4 gm. (38% yield) of 90% pure sodium salt of 6-(α-carbamoylbenzyl)carbonamido-penicillanic acid of the formula

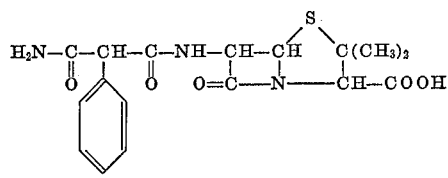

The product was identical to that of Example L.

EXAMPLE LVII

A suspension of 2.36 gm. (10 mmol) of 1-phenylacetyl-benzimidazole obtained by reacting 1-trimethylsilyl-benz-imidazol and phenylacetyl chloride in 20 cc. of dry toluene was cooled to —70° C. and then a solution of 10 mmol of n-butyllithium and 10 mmol of N,N,N',N'-tetra-methyl-ethylene diamine in a mixture of 4.3 cc. of hexane and 10 cc. of light petroleum ether cooled below —60° C. was added thereto dropwise. After stirring for 1 hour at —60° C., a solution of 3.0 gm. (9.5 mmol) of the tri-methylsilyl ester of 6-isocyanato-penicillanic acid in 10 cc. of toluene was added thereto dropwise at —65° C. and then the mixture was stirred for 1 hour at —60° C. and worked up to obtain by extraction at a pH of 4 a solution of product in diethylether. The solution was evaporated to dryness under reduced pressure to obtain a slightly yellow solid product of 6-[(α-benzimidazole-1'-yl-carbonyl)benzylcarbonamido]penicillanic acid of the formula

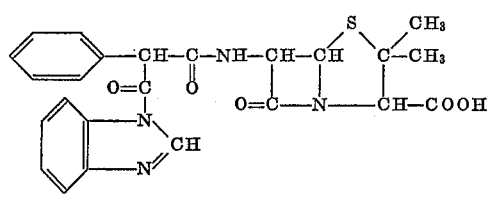

Its structure was confirmed by its infrared and PMR spectrum. Analysis of the PMR spectrum of the final product dissolved in a mixture of hexadeuterio acetone and a small amount of hexadeuterio dimethylsulfoxide (60 Mc, δ-values in p.p.m. internal reference tetramethylsilane):

$C_3$—$CH_3$: 1.56 and 1.69 (6 protons)
$C_2$—H: 4.38 (1 proton)
$C_5$—H and $C_6$—H: 5.4→5.8 (multiplet)
$C_\alpha$—H: 5.65 } 3 protons
$C_6H_5$: about 7.3
$C_6H_4$ and N—H: 7.0→8.2 (extended multiplet) } about 11 protons
$C_{2'}$—H: 8.62 (1 proton)

In in vitro tests, the product had a minimum inhibitory concentration of not more than 3γ/cc. against *Bacillus subtilis* 6633, *Staphylococcus aureus* A55 and A321, *Streptococcus haemolyticus* A266 and *Diplococcus pneumoniae* L54.

Various modifications of the process and products of the invention may be made without departing from the spirit or scope thereof and it is to be understood that the invention is to be limited only as defined in the appended claims.

I claim:
1. A compound of the formula

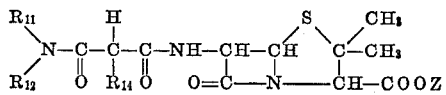

wherein $R_{11}$ is selected from the group consisting of hydrogen and lower alkyl of 1 to 7 carbon atoms, $R_{12}$ is selected from the group consisting of hydrogen, lower alkyl of 1 to 7 carbon, phenyl, benzyl, benzoyl, phenyl, sulfonyl, pyridyl; and $R_{11}$ and $R_{12}$ taken together with the nitrogen atom to which they are attached form a heterocyclic of 6 to 11 atoms which may contain another nitrogen, oxygen or sulfur hetero atom; $R_{14}$ is phenyl or phenoxy, and the groups of $R_{11}$, $R_{12}$ and $R_{14}$ may be substituted with at least one lower alkyl, and Z is selected from the group consisting of hydrogen, alkyl, alkali metal cations, alkaline earth metal cations, amines, or amide derivatives of the free acids.

2. A compound of claim 1 selected from the group consisting of 6-(α-N,N - diethylcarbamoylbenzyl)carbonamido-penicillanic acid, its salts and lower alkyl esters.

3. A compound of claim 1 selected from the group consisting of 6-(α-N - isopropylcarbamoylbenzyl)carbonamido-penicillanic acid, its salts and lower alkyl esters.

4. A compound of claim 1 selected from the group consisting of 6 - (α - carbamoylphenoxymethyl)carbonamido-penicillanic acid, its salts and lower alkyl esters.

5. A compound of claim 1 selected from the group consisting of 6-(α - 4' - morpholinocarbonylbenzyl)carbonamido - penicillanic acid, its salts and lower alkyl esters.

6. A compound of claim 1 selected from the group consisting of 6-[α-(N-p-tolylsulphonyl)carbamoylbenzyl]carbonamido-penicillanic acid, its salts and lower alkyl esters.

7. A compound of claim 1 selected from the group consisting of 6-[α-(2'-pyridyl)carbamoylbenzyl]carbonamido-penicillanic acid, its salts and lower alkyl esters.

8. A compound of claim 1 selected from the group consisting of 6 - [α - (benzoyl)carbamoylbenzyl]carbonamido-penicillanic acid, its salts and lower alkyl esters.

9. A compound of claim 1 selected from the group consisting of 6-[(α-benzimidazole-1'-yl-carbonyl)benzyl]carbonamido-penicillanic acid, its salts and lower alkyl esters.

10. A compound of claim 1 selected from the group consisting of 6-(α-carbamoylbenzyl)carbonamido-penicillanic acid, its salts and lower alkyl esters.

References Cited
UNITED STATES PATENTS

| | | | |
|---|---|---|---|
| 3,308,023 | 3/1967 | Russell | 260—239.1 |
| 3,325,477 | 6/1967 | Fosker et al. | 260—239.1 |
| 3,352,851 | 11/1967 | Fosker | 260—239.1 |
| 3,479,339 | 11/1969 | Holdrege | 260—239.1 |
| 3,481,922 | 12/1969 | Holdrege | 260—239.1 |
| 3,483,188 | 12/1969 | McGregor | 260—239.1 |

NICHOLAS S. RIZZO, Primary Examiner

U.S. Cl. X.R.

424—271

Disclaimer 3,741,958.—*Peter Wolfgang Henniger*, Leiden, Netherlands. 6-AMINOPENICILLANIC ACID DERIVATIVES AND PROCESS FOR PRODUCING. Patent dated June 26, 1973. Disclaimer filed Sept. 26, 1973, by the assignee, *American Home Products Corporation*.

Hereby enters this disclaimer to claim 10 of said patent.

[*Official Gazette March 19, 1974.*]